United States Patent [19]

Nagase et al.

[11] Patent Number: 5,554,706
[45] Date of Patent: Sep. 10, 1996

[54] MESOGENIC ACRYLATE COPOLYMERS HAVING BOTH SILOXY AND ALKYLENE SPACER GROUPS

[75] Inventors: Yu Nagase; Eiichi Akiyama; Yuriko Takamura, all of Kanagawa, Japan

[73] Assignee: Sagami Chemical Research Center, Sagamihara, Japan

[21] Appl. No.: 532,572

[22] PCT Filed: Mar. 31, 1994

[86] PCT No.: PCT/JP94/00539

§ 371 Date: Oct. 19, 1995

§ 102(e) Date: Oct. 19, 1995

[87] PCT Pub. No.: WO94/24180

PCT Pub. Date: Oct. 27, 1994

[30] Foreign Application Priority Data

Apr. 20, 1993 [JP] Japan .................................. 5-115182

[51] Int. Cl.⁶ .......................... C08F 230/08; C09K 19/00
[52] U.S. Cl. .......................... 526/279; 252/299.01; 428/1
[58] Field of Search .................. 526/279; 252/299.01; 428/1

[56] References Cited

U.S. PATENT DOCUMENTS 5,447,655  9/1995  Sato et al. ..................... 252/299.01

OTHER PUBLICATIONS

Y. Nagase et al. (1992) Makromol. Chem. 193(5),1225–1234.

M. Engel et al (1985) Pure & Appl. Chem 57 (7) 1009–1014.

Primary Examiner—Mark Nagumo
Attorney, Agent, or Firm—Oblon, Spivak, McClelland, Maier & Neustadt, P.C.

[57] ABSTRACT

The present invention relates to a copolymer consisting of a polyacrylate type backbone having mesogenic groups in the side chains, which comprises an acrylate type repeating unit (I) wherein a mesogenic group is bonded by an ester linkage via an alkylene chain, and an acrylate type repeating unit (II) wherein a mesogenic group is bonded by an ester linkage via an alkylene chain containing a siloxane bond; the molar ratio of the repeating unit of the formula (I) to the repeating unit of the formula (II) ranging from 95/5 to 20/80 and the number average molecular weight being at least 1,000. The copolymer of the present invention exhibits liquid crystallinity at a relatively low temperature, i.e., around a room temperature. Accordingly, the polymer is useful for a display material of a large area, a light-shuttering material and a light-controlling glass material.

2 Claims, No Drawings

MESOGENIC ACRYLATE COPOLYMERS HAVING BOTH SILOXY AND ALKYLENE SPACER GROUPS

TECHNOLOGICAL FIELD

The present invention relates to a copolymer comprising a repeating unit wherein a backbone structure and a mesogenic group are bonded by means of a spacer consisting of an alkylene chain, and a repeating unit wherein a backbone structure and a mesogenic group are bonded by means of a spacer containing a flexible siloxane bond. More specifically, the present invention relates to a copolymer having a mesogenic group in the side chain comprising a repeating unit represented by the following formula (I) and a repeating unit represented by the following formula (II), wherein molar ratio of the repeating unit of the formula (I) to the repeating unit of the formula (II) ranges from 95/5 to 20/80 and the number average molecular weight is at least 1,000.

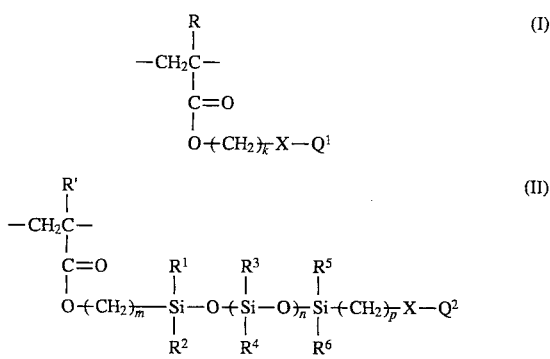

wherein, each of R and R' which may be the same or different, is a hydrogen atom, a halogen atom, an alkyl group, or a phenyl group, each of $R^1$ to $R^6$, which may be the same or different, is an alkyl group or a phenyl group, X is a single bond, an oxygen atom, or a group of the formula —COO— or —OCO—, each of $Q^1$ and $Q^2$, which may be the same or different, is a mesogenic group, k is an integer of from 2 to 20, each of m and p is an integer of from 2 to 10, and n is an integer of from 0 to 10.

BACKGROUND ART

Heretofore, side chain liquid crystalline polymers having mesogenic groups in the side chains have been studied for a wide range of applications as functional materials for display elements or recording materials in the electronics field or recently as functional materials useful for nonlinear optical materials or light-controlling glass. These side chain liquid crystalline polymers have a structure in which mesogenic groups are bonded to the polymer backbone by means of a spacer.

As the backbone structure, polymers such as polymethacrylate, polyacrylate, polyether, polyorganosiloxane and polyester are known, and many side chain liquid crystalline polymers have been proposed (For example, Liquid Crystal Polymer, CMC, edit. by Naoyuki Koide (1987); R. Zentel, "Liquid Crystalline Polymers", Kem. Ind., Vol. 37, p. 355 (1988); V. P. Shibaev, "Synthesis and Structure of Liquid-crystalline side-chain polymers", Pure & Appl. Chem. Vol. 57, p. 1589 (1985); T. Chung, "The Recent Developments of Thermotropic Liquid Crystalline Polymers", Polym. Eng. Sci., Vol. 26, p. 901 (1986)).

Further, it has been reported that by means of a spacer, the mobility of the backbone structure and that of the mesogenic groups tend to be independent, whereby orientation of liquid crystals will be facilitated, and by means of a long spacer or a more flexible spacer, a more stable liquid crystalline phase can be obtained (Naoyuki Koide, "Synthesis of Polymer Liquid Crystals", Kobunshi, Vol. 36, p. 98 (1987)). Heretofore, most of the chemical bonds known as such spacers are alkylene groups or oxyalkylene groups. It is reported a spacer containing a siloxane component which is known as a flexible chemical bond (EP-0471577-A; Y. Nagase and Y. Takamura, Makromol. Chem., Vol. 193, p. 1225 (1992)).

However, when spacers consisting of alkylene groups alone are used for the above mentioned backbone structures, the temperatures at which polymers show liquid crystalline phase are usually high, and in most cases, they show no liquid crystalline phase but glass phase at temperatures around room temperature. Further, the side chain liquid crystalline polymers containing siloxane components in the spacer possess problems that synthesis of the monomers requires many steps and also high cost owing to employment of expensive silane compounds, though they show liquid crystalline phase at relatively low temperature because of the flexibility of the siloxane bonds.

In view of such a drawback of side chain liquid crystalline polymers having conventional spacers, it is an object of the present invention to provide a side chain liquid crystalline polymer which exhibits stable liquid crystalline phase at a relatively low temperature, i.e., at room temperature or a lower temperature, by utilizing more effectively a monomer containing a siloxane component in the spacer.

DISCLOSURE OF INVENTION

The present inventors have conducted extensive researches on effective utilization of a monomer containing a siloxane component in order to synthesize a side chain liquid crystalline polymer which show liquid crystalline phase at a practical low temperature. As a result, they have found that a copolymer exhibiting liquid crystalline phase at relatively low temperature can be synthesized by copolymerization of a monomer wherein a backbone structure and a mesogenic group are bonded by means of a siloxane bond with a conventional monomer having a spacer consisting of an alkylene chain alone. The temperature is almost the same level as the temperature at which a corresponding homopolymer of the former monomer exhibits liquid crystalline phase. The present invention has been accomplished on the basis of these discoveries.

Namely, the present invention provides a copolymer having a mesogenic group in the side chain comprising a repeating unit represented by the following formula (I):

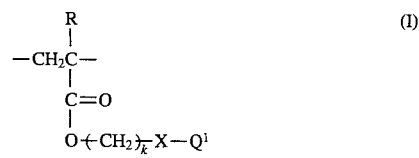

wherein, R is a hydrogen atom, a halogen atom, an alkyl group or a phenyl group, X is a single bond, an oxygen atom or a group of the formula —COO— or —OCO—, $Q^1$ is a mesogenic group, and k is an integer of from 2 to 20, and a repeating unit represented by the following formula (II):

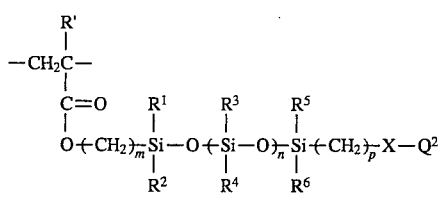

(II)

wherein, R', which may be the same or different to the above R, is a hydrogen atom, a halogen atom, an alkyl group or a phenyl group, each of $R^1$ to $R^6$, which may be the same or different, is an alkyl group or a phenyl group, X is a single bond, an oxygen atom or a group of the formula —COO— or —OCO—, $Q^2$ which may be the same or different to the above $Q^1$, is a mesogenic group, each of m and p is an integer of from 2 to 10, and n is an integer of from 0 to 10; and the molar ratio of the repeating unit of the formula (I) to the repeating unit of the formula (II) ranges from 95/5 to 20/80 and the number average molecular weight is at least 1,000.

The mesogenic group represented by $Q^1$ and $Q^2$ in the above formulas (I) and (II) is a known liquid crystallinity-imparting group, and there is no particular restriction as to its structure. The mesogenic group includes a group which is formed by removing one hydrogen atom from a mesogen molecule such as biphenyl, biphenyl ether, phenyl benzoate, biphenyl benzoate, benzylideneaniline, stilbene, azoxybenzene, azobenzene, a schiff base, cyclohexyl phenyl ether, cyclohexylbenzene, phenyl cyclohexanecarboxylate, biphenyl cyclohexanecarboxylate, cholesterol, cholestane or a derivative thereof. Further, a polar group such as an alkyl having an optically active group, alkoxy group, a fluoroalkyl group, a cyanoalkyl group or a cyanoalkoxy group may be bonded to the above mesogen molecule, so that a special effect such as a ferroelectric nature be imparted to the polymer prepared according to the method of the present invention.

The substituent represented by each of R and R' in the above formulas (I) and (II) may, for example, be a hydrogen atom, a halogen atom such as fluorine, chlorine, bromine or iodine, a linear or branched alkyl group such as a methyl group, an ethyl group, a propyl group, an iso-propyl group, a butyl group, a t-butyl group or a hexyl group, or a phenyl group. However, the substituent represented by the R is preferably a hydrogen atom, a halogen atom, or a methyl group from the viewpoint of easiness in the synthesis.

The substituent for each of $R^1$ to $R^6$ in the above formulas (I) and (II) may, for example, be a linear or branched alkyl group such as a methyl group, an ethyl group, a propyl group, an iso-propyl group, a butyl group, a iso-butyl group, a t-butyl group, pentyl group or a hexyl group, or a phenyl group. However, a methyl group is most preferred among the above substituents, from the viewpoint of easiness in the synthesis and in order to make the best use of the characteristics of the polymer having a mesogenic group of the present invention. The methylene chain in the above formulas (I) and (II) is required to have a certain length. Accordingly, in the formulas, the number of methylene groups represented by k is within a range of from 2 to 20, and the number of methylene groups represented by each of m and p is within a range of from 2 to 10. However, each of m and p is more preferably within a range of from 3 to 6 from the viewpoint of easiness in the synthesis and in order to make the best use of the characteristics of the polymer mesogenic groups of the present invention. Further, the number of siloxane units represented by n in the formula (II) is within a range of from 0 to 10, and is more preferably within a range of from 0 to 5 from the viewpoint of easiness in the synthesis and in order to make the best use of the characteristics of the side chain liquid crystalline polymer of the present invention.

The copolymer of the present invention is obtained by mixing and polymerizing a monomer represented by the following formula (III):

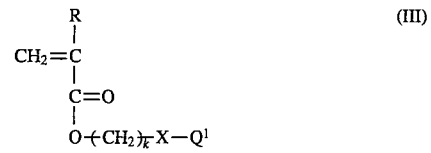

(III)

wherein, R is a hydrogen atom, a halogen atom, an alkyl group, or a phenyl group, X is a single bond, an oxygen atom, or a group of the formula —COO— or —OCO—, Q1 is a mesogenic group, and k is an integer of from 2 to 20; and a monomer represented by the following general formula (IV):

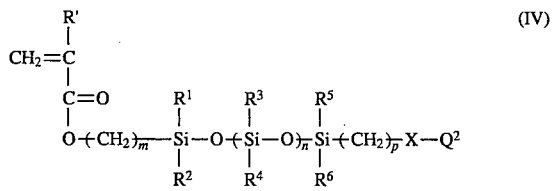

(IV)

wherein, R', which may be the same or different to the above R, is a hydrogen atom, a halogen atom, an alkyl group or a phenyl group, each of $R^1$ to $R^6$, which may be the same or different, is an alkyl group or a phenyl group, X is a single bond, an oxygen atom or a group of the formula —COO— or —OCO—, $Q^2$ is a mesogenic group, each of m and p is an integer of from 2 to 10, and n is an integer of from 0 to 10. At the copolymerization, a known addition polymerization method such as radical polymerization, anionic polymerization or cationic polymerization, may be employed. However, in this case, radical polymerization is preferably employed as the preferably employed as the simplest method. When the polymerization is conducted by the radical polymerization method, a known method such as bulk polymerization method, solution polymerization or emulsion polymerization, may be employed. The radical polymerization may simply be initiated by heating, irradiation with ultraviolet rays or addition of a radical initiator. As the radical initiator which can suitably be employed for the reaction, an organic peroxide such as dilauroyl peroxide, di-t-butyl peroxide, benzoyl peroxide, t-butyl hydroperoxide or cumene hydroperoxide, or an azo compound such as α,α'-azobisisobutyronitrile or azobiscyclohexanecarbonitril, may be mentioned.

Further, the molecular weight of the resulting polymer can be controlled to some extent by adding a chain transfer agent during the polymerization. As the chain transfer agent to be used here, carbon tetrachloride, bromotrichloromethane, p-benzoquinone, chloroanile, n-butanethiol, n-dodecanethiol or the like, may be mentioned. As the organic solvent to be used for the radical polymerization, it is possible to employ benzene, toluene, chlorobenzene, tetrahydrofuran, chloroform, methyl ethyl ketone, fluorobenzene, methanol, ethanol, n- or i-propanol, N,N-dimethylformamide or N,N-dimethylacetamide. However, the solvent is not limited to such specific examples. The reaction usually proceeds smoothly within a temperature range of from 40° to 100° C.

The monomer represented by the above formula (III) is a known compound and the preparation is described in many literatures, for example, H. Finkelmann, H. Ringsdorf and J. H. Wendorff, Makromol. Chem., Vol. 179, p. 273 (1978); R. Zentel and H. Ringsdorf, Makromol. Chem., Rapid Commun., Vol. 5, p. 393 (1984); V. Shibaev and N. Plate, Pure and Appl. Chem., Vol. 57, p. 1589 (1985); C. S. Hsu and V. Percec, J. Polym. Sci., Polym. Chem. Ed., Vol. 26, p. 2047 (1988); Vol. 27, 453 (1989).

The monomer of the above formula (IV) can be prepared, for example, according to the following synthetic methods.

The following method can be used in a case where the degree of polymerization of the siloxane chain represented by n in the above formula (IV) is 0, i.e., in a case where a monomer wherein a polymerizable group and a mesogenic group are bonded by means of a spacer containing a disiloxane bond, is to be prepared. Namely, the desired monomer can be prepared by reacting a silanol compound having a mesogenic group, of the following formula (V)

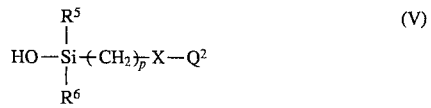

wherein, each of $R^5$ and $R^6$, which may be the same or different, is an alkyl group or a phenyl group, X is a single bond, an oxygen atom or a group of the formula —COO— or —OCO—, $Q^2$ is a mesogenic group, and p is an integer of from 2 to 10; with a chlorosilane compound having a polymerizable group, of the following formula (VI)

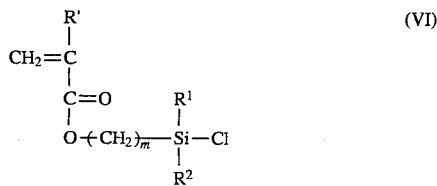

wherein, R' is a hydrogen atom, a halogen atom, an alkyl group or a phenyl group, each of $R^1$ and $R^2$ which may be the same or different, is an alkyl group or a phenyl group, and m is an integer of from 2 to 10.

When the silanol compound of the above formula (V) is reacted with the chlorosilane compound of the above formula (VI), hydrogen chloride will be generated. Therefore, the reaction is preferably conducted in the presence of an organic base such as triethylamine, N,N-dimethylaniline or pyridine as a scavenger so that the reaction proceeds smoothly. This reaction is preferably conducted in an organic solvent. Here, as such a solvent, tetrahydrofuran, benzene, toluene, n-hexane, chloroform, carbon tetrachloride or the like, may preferably be used. Further, the reaction is preferably conducted in an atmosphere of an inert gas such as argon or nitrogen. The chlorosilane compound of the above formula (VI) to be used here, includes, for example, 2-(acryloxy)ethyldimethylchlorosilane, 2(methacryloxy)ethyldimethylchlorosilane, 2-(α-ethylacryloxy)ethyldimethylchlorosilane, 2-(α-butylacryloxy)ethyldimethylchlorosilane, 2-(α-chloroacryloxy)ethyldimethylchlorosilane, 2-(α-fluoroacryloxy)ethyldimethylchlorosilane, 2-(α-cianoacryloxy)ethyldimethylchlorosilane, 2-(α-phenylacryloxy)ethyldimethylchlorosilane, 3- (acryloxy)-propyldimethylchlorosilane, 3-(methacryloxy)propyldimethylchlorosilane, 3-(α-butylacryloxy)propyldimethylchlorosilane, 3-(α-butylacryloxy)propyldimethylchlorosilane, 3-(α-fluoroacryloxy)propyldimethylchlorosilane, 3-(cyanoacryloxy)propyldimethylchlorosilane, 3-(α-phenylacryloxy)propyldimethylchlorosilane, 4-(methacryloxy)butyldimethylchlorosilane, 5-(methacryloxy)pentyldimethylchlorosilane, 6-(methacryloxy)hexyldimethylchlorosilane, 3-(methacryloxy)propyldiethylchlorosilane, 3-(methacryloxy)propyldibutylchlorosilane, 3-(methacryloxy)propyldihexylchlorosilane, 3-(methacryloxy)propylmethylbutylchlorosilane, 3-(methacryloxy)propylmethylhexylchlorosilane, 3-(methacryloxy)propylmethylphenylchlorosilane, 3-(methacryloxy)propyldiphenylchlorosilane. Some of these compounds are commercially available. Further, the compounds can be prepared by hydrosilylation of a corresponding alkenyl ester of α-substituted or unsubstituted acrylic acid with a diorganochlorosilane.

In a case where the polymerization degree of the siloxane chain represented by n in the above formula (IV) is at least 1, i.e., in a case where a monomer in which a polymerizable group and a mesogenic group are bonded by means of a spacer containing a polysiloxane bond is to be prepared, the following method can be employed. Namely, the monomer can be prepared by reacting the silanol compound of the above formula (V) with a dichloro compound of the following formula (VII):

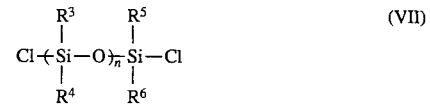

wherein, each of $R^3$ to $R^6$ which may be the same or different, is an alkyl group or a phenyl group and n is an integer of from 0 to 10; and then reacted with a silanol compound having a polymerizable group, of the following formula (VIII):

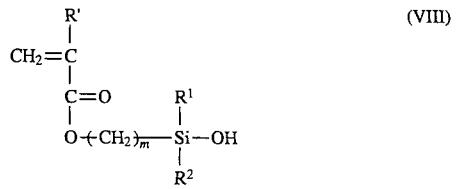

wherein, R' is a hydrogen atom, a halogen atom, an alkyl group or a phenyl group, each of $R^1$ and $R^2$ which may be the same or different, is an alkyl group or a phenyl group, and m is an integer of from 2 to 10.

At the reaction, it is preferred to employ at least two molar equivalent of the dichloro compound of the above formula (VII) relative to the silanol compound having a mesogenic group, of the above formula (V). Further, the reaction is preferably conducted by diluting the compound of the above formula (V) with an organic solvent. As the organic solvent to be used here, it is suitable to employ hexane, heptane, diethyl ether, ethyl acetate, benzene, toluene, xylene, chloroform, dichloromethane, dichloroethane, acetone, tetrahydrofuran or the like. However, the solvent is not limited to such specific examples. Further, it is preferred to conduct the reaction under cooling at around 0° C. in view of suppressing side-reactions. In this reaction, hydrogen chloride will be generated. Therefore, the reaction is preferably conducted in the presence of an organic base such as triethylamine, N,N-dimethylaniline or pyridine as a scavenger so that the reaction proceeds smoothly.

When the desired monomer is prepared by reacting the silanol compound having a polymerizable group, of the above formula (VIII) directly after the above reaction, it is preferred to remove remaining dichloro compound from the reaction media by evaporation. Also, the reaction is preferably conducted in an organic solvent and the above solvents are preferably employed. In this reaction, hydrogen chloride will also be generated. Therefore, the reaction smoothly proceeds in the presence of an organic base such as triethylamine, N,N-dimethylaniline or pyridine as a scavenger.

The dichloro compound of the above formula (VII) to be used at the above preparation, includes, for example, dichlorodimethylsilane, dichlorodiethylsilane, dichlorodipropylsilane, dichlorodibutylsilane, dichlorodiisopropylsilane, dichlorodihexylsilane, dichloromethylethylsilane, dichloromethylphenylsilane, dichlorodiphenylsilane, 1,3-dichlorotetramethyldisiloxane, 1,3-dichlorotetraethyldisiloxane, 1,3-dichlorotetraphenyldisiloxane, 1,5-dichlorohexamethyltrisiloxane, 1,7-dichlorooctamethyltetrasiloxane, 1,9-dichlorodecamethylpentasiloxane, 1,11-dichlorododecamethylhexasiloxane, and the like. These compounds are commercially available.

Further, the silanol compound having a polymerizable group, of the above formula (VIII) can be prepared, for example, according to the following method. Namely, the chlorosilane compound having a polymerizable group, of the above formula (VI) is dissolved in an organic solvent and is reacted with an excess water or water containing an organic solvent to obtain the silanol compound having a polymerizable group, of the above formula (VIII). As the organic solvent to be used here, it is possible to employ hexane, heptane, diethyl ether, ethyl acetate, benzene, toluene, xylene, chloroform, dichloromethane, dichloroethane, acetone, tetrahydrofuran and the like. However, the solvent is not limited to such specific examples. Further, the reaction is preferably conducted under cooling at around 0° C. in view of suppressing side-reactions.

The silanol compound having a mesogenic group, of the above formula (V), which is used in the process for preparing the monomer of the above formula (IV) may be synthesized, for example, according to the following method. Namely, an alkenyl compound having a mesogenic group, of the following formula (IX):

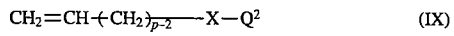

$$CH_2=CH-(CH_2)_{p-2}-X-Q^2 \quad (IX)$$

wherein, X is a single bond, an oxygen atom, or a group of the formula —COO— or —OCO—, $Q^2$ is a mesogenic group, and p is an integer of from 2 to 10; and an alkoxysilane compound of the following formula (X):

$$A-O-\underset{\underset{R^6}{|}}{\overset{\overset{R^5}{|}}{Si}}-H \quad (X)$$

wherein, each of $R^5$ and $R^6$, which may be the same or different, is an alkyl group or a phenyl group, and A is an alkyl group; are reacted in the presence of a hydrosilylation catalyst to obtain a compound of the following formula (XI):

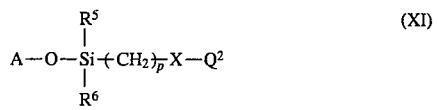

$$A-O-\underset{\underset{R^6}{|}}{\overset{\overset{R^5}{|}}{Si}}-(CH_2)_{p}-X-Q^2 \quad (XI)$$

wherein, each of $R^5$ and $R^6$, which may be the same or different, is an alkyl group or a phenyl group, A is an alkyl group, X is a single bond, an oxygen atom or a group of the formula —COO— or —OCO—, $Q^2$ is a mesogenic group, and p is an integer of from 2 to 10; and the compound of the above formula (XI) is then hydrolyzed to obtain a silanol compound having a mesogenic group, of the above formula (V).

As the hydrosilylation catalyst to be used for the reaction of the alkenyl compound of the above formula (IX) and the alkoxysilane compound of the above formula (X) to obtain the compound of the above formula (XI) in the above process, it is most common to employ a platinum type catalyst such as platinum, platinum-carbon, chloroplatinic acid or dicyclopentadienylplatinum dichloride. However, it is also possible to employ a metal complex containing palladium or rhodium. For example, $(Ph_3P)_4Pd$, $(Ph_3P)_2PdCl_2$, $(PhCN)_2PdCl_2$, $(Ph_3P)_3RhCl$, $(Ph_2PH)_2RhCl$, $(Ph_3P)_2(CO)RhCl$, or $[(C_2H_5)_3P]_2(CO)RhCl$ may be used as the catalyst. The catalyst may be used usually in an amount of from $\frac{1}{100}$ to $\frac{1}{1,000}$ equivalent relative to the alkenyl compound of the above formula (IX). To complete the reaction, it is necessary to mix the reactants so that the compound of the above formula (X) would be at least equimolar to the compound of the above formula (IX). This reaction is preferably conducted in a solvent. As such a solvent, hexane, benzene, toluene, acetone, trichloroethylene, carbon tetrachloride, tetrahydrofuran or the like, may be employed. The reaction is conducted usually at a temperature within a range of from 40° to 100° C., and preferably conducted in an atmosphere of an inert gas such as argon or nitrogen.

The synthesis of the alkenyl compound having a mesogenic group, of the above formula (IX) can be readily be accomplished by introducing an alkenyl group directly to the above mesogenic group or by introducing an alkenyl group in one of the steps for synthesizing the above mesogenic group, as will be described in Examples.

The alkoxysilane compound of the above formula (X) includes, for example, dimethylmethoxysilane, dimethylethoxysilane, dimethylpropoxysilane, dimethylisopropoxysilane, diethylethoxysilane, dipropylethoxysilane, dibutylethoxysilane, dihexylethoxysilane, methylethylethoxysilane, methylphenylethoxysilane, diphenylethoxysilane. Some of these compounds are commercially available and the compounds can easily be prepared by condensation of a corresponding commercially availabe chlorosilane with an alcohol.

The hydrolysis for the preparation of the silanol compound of the above formula (V) from the compound of the above formula (XI) is conducted usually in the presence of a basic or acidic substance, whereby the reaction proceeds smoothly. As the basic or acidic substance to be used, it is preferred to employ a basic substance such as lithium hydroxide, potassium hydroxide, sodium hydroxide, aluminum hydroxide, potassium carbonate, sodium carbonate, potassium acetate or sodium acetate, or an acidic substance such as hydrochloric acid, sulfuric acid, nitric acid, acetic acid, calcium sulfate, calcium nitrate or magnesium sulfate. When a bond susceptible to hydrolysis such as an ester bond is present in the mesogenic group $Q^2$ in the above formula (XI), it is preferred to employ a weakly basic substance or a weakly acidic substance among the above mentioned basic or acidic substances. Such a basic or acidic substance is used preferably within a range of from 0.1 to 5.0 equivalent to the compound of the above formula (XI).

Further, it is necessary to conduct this reaction in the presence of water. When the compound of the above formula (XI) is insoluble in water, an organic solvent soluble in water, such as methanol, ethanol, propanol, acetone, tetrahydrofuran or acetonitrile, may be used in combination, so that the reaction proceeds smoothly. The reaction can usually be conducted at around room temperature. If the temperature is high, a disiloxane compound which is a dimer of the desired silanol, may sometimes be formed as a by-product. In a case where such a dimerization is likely to proceed, it is necessary to control the reaction temperature within a range of from −100° C. to room temperature in order to suppress the formation of the by-product as little as possible.

In the copolymer having a mesogenic group, of the present invention, the molar ratio of the repeating unit of the above formula (I) to the repeating unit of the above formula (II) ranges from 95/5 to 20/80, preferably from 90/10 to 40/60, more preferably from 80/20 to 50/50. When the content of the repeating unit of the above formula (II) is less than the above lower limit, the glass transition temperature of the resulting copolymer becomes high and, as a result, the liquid crystalline temperature range shifts to high temperature region. When the content of the repeating unit of the above formula (II) is more than the above upper limit, the resulting copolymer tend to resist formation of liquid crystalline phase, and the monomer containing siloxane component in the spacer cannot be effectively utilized. The above molar ratio, i.e., the composition of the copolymer can easily be controlled by changing the feed ratio of the monomer of the above formula (III) to the monomer of the above formula (IV) at the above polymerization. Further, the number average molecular weight of the copolymer of the present invention is preferably not less than 1,000 in order to make the best use of the characteristics of polymer. The molecular weight is determined according to a known method such as gel permeation chromatography, osmotic pressure method, light-scattering method, viscosity method, or the like.

BEST MODE FOR CARRYING OUT THE INVENTION

Now, the present invention will be described in further detail with reference to Reference Examples, Working Examples, and Comparative Examples. However, it should be understood that the present invention is by no means restricted to such specific Examples.

Reference Example 1

Synthesis of monomers having an alkylene spacer

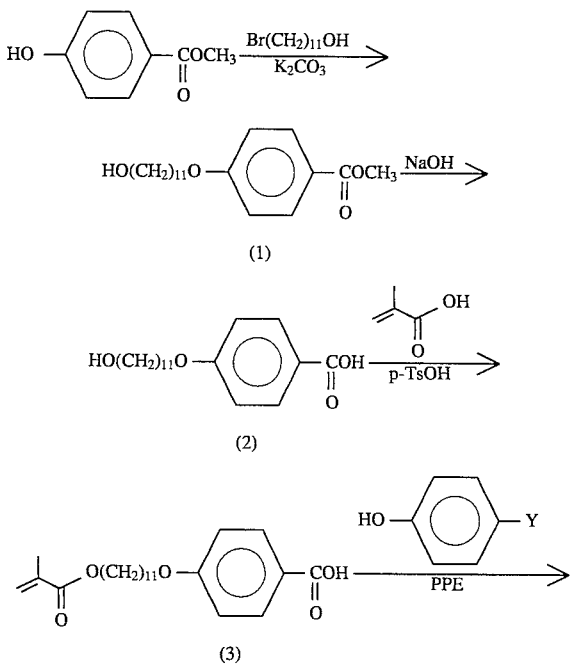

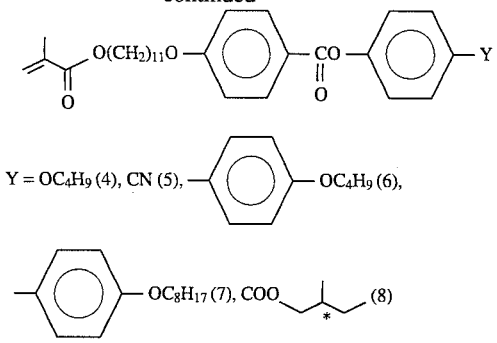

With 100 ml of 2-butanone were mixed 20.0 g (79.6 mmol) of 11-bromoundecane-1-ol, 11.0 g (72.5 mmol) of methyl p-hydroxybenzoate, and 10.0 g (72.4 mmol) of potassium carbonate. The whole was refluxed for 48 hours. Upon cooling the reaction mixture to room temperature, a large amount of precipitate appeared. The precipitate was collected by filtration under washing with hexane and dried to obtain 20.2 g of methyl p-(11-hydroxyundecyloxy)benzoate (1) (yield: 86.7%).

$^1$H-NMR, δ (CDCl$_3$, ppm); 1.00–1.90 (m, 18H), 3.60 (m, 2H), 3.88 (s, 3H), 4.00 (t, 2H), 6.89 (d, 2H, J=9.0Hz), 7.98 (d, H, J=9.0Hz).

IR (KBr, cm$^{-1}$); 3330 (—OH), 2910, 2890, 1720, 1605 (C=O), 1505, 1430, 1310, 1280, 1255, 1165, 1105, 1012, 842, 760, 695.

The resulting 20.2 g (65.6 mmol) of the compound (1) was dissolved in 50 ml of methanol and 50 ml of acetone. After addition of a solution of 14 g of sodium hydroxide in 100 ml of water to the above solution, the whole was refluxed for 2 hours. Upon removing the solvent by evaporation, the obtained white solid was dissolved in water. White precipitate was formed when hydrochloric acid was added until the solution became acidic, and was collected by filtration. The precipitate was thoroughly washed with water and dried to obtain 19.1 g of p-(11-hydroxyundecyloxy)benzoic acid (2) (yield: 98.5%).

$^1$H-NMR, δ (CDC$_3$, ppm); 1.20–2.00 (m, 18H), 3.62 (t, 2H), 4.00 (t, 2H), 6.90 (d, 2H, J=9.0Hz), 8.01 (d, 2H, J=9.0Hz). IR (KBr, cm$^{-1}$); 3430 (—OH), 2910, 2850, 2670, 2550, 1670 (C=O), 1602, 1435, 1302, 1248, 1162, 1140, 840, 762, 640.

In 200 ml of chloroform were dissolved 15.0 g (48.6 mmol) of the compound (2), 60.0 g (697 mmol) of methacrylic acid, 2.0 g of p-toluenesulfonic acid, and 3.0 g of hydroquinone as polymerization inhibitor. The whole was refluxed for 13 hours under removing water formed. Then, after removal of solvent, the reaction mixture was poured into a plenty of ice-water, and the resulting precipitate was collected by filtration and dried after washing with water. The obtained white solid was recrystallized from acetone to obtain 14.5 g of p-(11-methacryloxyundecyloxy)benzoic acid (3) (yield: 78.9%).

$^1$H-NMR, δ (CDC$_3$, ppm); 1.00–1.90 (m, 18H), 1.94 (s, 3H), 4.02 (t, 2H, J=6.2Hz), 4.14 (t, 2H, J=6.2Hz), 5.53 (s, 1H), 6.09 (s, 1H), 6.92 (d, 2H, J=9.0Hz), 8.03 (d, 2H, J=9.0Hz).

IR (KBr, cm$^{-1}$); 2915, 2848, 2660, 2550, 1700, 1680 (C=O), 1630, 1600, 1425, 1250, 1168, 768, 640.

Polyphosphoric acid ester (hereinafter referred to PPE) was obtained as a viscous colorless liquid by adding 100 ml of chloroform and 200 ml of diethyl ether to 90 g of phosphorus pentachloride, and refluxing the whole at 60° C. for 2 days under argon atmosphere, followed by removal of the solvent. The compound (3) obtained as above and an equimolar amount of 4-butoxyphenol, 4-cyanophenol, 4-butoxy-4'-hydroxybiphenyl, 4-octoxy-4'-hydroxybiphenyl or S-2-methylbutyl 4-hydroxybenzoate were mixed and dissolved in chloroform, respectively. Then, an excess PPE was added to each solution and each resulting mixture was stirred at room temperature for 24 hours. After completion of the reaction, water and methylene chloride were added to each mixture and the organic phase was recovered. Removal of the solvent and purification by column chromatography afforded desired monomers (4) to (8). The following show their yields and spectral data.

Monomer (4): Yield; 58.4%.

$^1$H-NMR, δ (CDC$_3$, ppm); 1.00 (t, 3H), 1.20–2.10 (m, 22H), 3.90–4.30 (m, 6H), 5.53 (s, 1H), 6.09 (s, 1H), 6.91–7.12 (m, 6H), 8.12 (d, 2H, J=8.8Hz).

IR (KBr, cm$^{-1}$); 2910, 2850, 1710 (C=O), 1602, 1472, 1260, 1192, 1166, 1070, 810.

Monomer (5): Yield; 74.8%.

$^1$H-NMR, δ (CDCl$_3$, ppm); 1.20–1.95 (m, 18H), 2.90 (s, 3H), 4.03 (t, 2H), 4.12 (t, 2H), 5.52 (s, 1H), 6.07 (s, 1H), 6.96 (d, 2H, J=9.0Hz), 7.33 (d, 2H, J=8.8Hz), 7.72 (d, 2H, J=9.0Hz), 8.10 (d, 2H, J=8.8Hz).

IR (KBr, cm$^{-1}$); 2910, 2850, 2225 (–CN), 1738, 1710 (C=O), 1632, 1600, 1510, 1252, 1212, 1162, 1065, 755, 548.

Monomer (6): Yield; 47.6%. $^1$H-NMR, δ (CDCl$_3$, ppm); 0.99 (t, 3H), 1.20–2.10 (m, 22H), 4.05–4.32 (m, 6H), 5.53 (s, 1H), 6.09 (s, 1H), 6.96 (d, 4H, J=8.6Hz), 7.23 (2H, d, J=8.6Hz), 7.50 (d, 2H, J=8.8Hz), 7.57 (d, 2H, J=8.6Hz), 8.15 (d, 2H, J=9.0Hz).

IR (KBr, cm$^{-1}$); 2915, 2845, 1722, 1704 (C=O), 1636, 1604, 1512, 1496, 1470, 1318, 1282, 1260, 1210, 1164, 1080, 1038, 818.

Monomer (7): Yield; 62.9%.

$^1$H-NMR, δ (CDCl$_3$, ppm); 0.89 (t, 3H), 1.11–2.15 (m, 30H), 3.90–4.20 (m, 6H), 5.53 (s, 1H), 6.09 (s, 1H), 6.96 (d, 4H, J=8.4Hz), 7.23 (d, 2H, J=8.6Hz), 7.50 (d, 2H, J=8.6Hz), 7.57 (d, 2H, 8.6Hz), 8.15 (d, 2H, J=8.8Hz).

IR (KBr, cm$^{-1}$); 2910, 2850, 1722, 1702 (C=O), 1638, 1608, 1580, 1512, 1496, 1470, 1398, 1398, 1318, 1260, 1216, 1192, 1166, 1080, 1038, 818.

Monomer (8): Yield; 60.4%. $^1$H-NMR, (CDCl3, ppm); 0.81–2.22 (m, 27H), 1.94 (s, 3H), 3.40 (t, 2H, J=8.2Hz), 4.06 (t, 2H, J=6.3Hz), 4.00–4.45 (m, 2H), 5.46 (s, 1H), 6.02 (s, 1H), 6.89 (d, 2H, J=9.0Hz), 7.21 (d, 2H, J=8.8Hz), 8.04 (d, 2H, J=8.8Hz), 8.06 (d, 2H, J=8.8Hz) .

IR (KBr, cm$^{-1}$); 2950, 2850, 1740, 1710 (C=O), 1600, 1510, 1470, 1300, 1250, 1200, 1160, 1100, 1050, 1030, 1000, 940, 810.

Reference Example 2

Synthesis of a monomer having an alkylene spacer

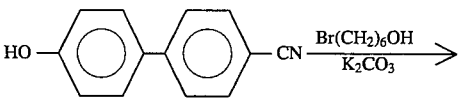

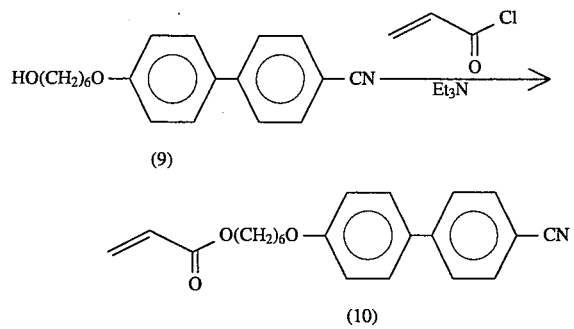

A solution of 0.10 g (0.51 mmol) of 4-cyano-4'-hydroxybiphenyl and 0.10 g (0.72 mmol) of potassium carbonate dissolved in 4 ml of 2-butanone was refluxed. After addition of 0.10 g (0.55 mmol) of 6-bromohexan-1-ol to the reaction mixture, the whole was refluxed overnight. After removal of the solvent by distillation, water was added to the residue and the whole was extracted with methylene chloride. The extract was purified by silica gel column chromatography. The resulting white solid was recrystallized from hexane to obtain 0.10 g of 4-cyano-4'(6-hydroxyhexyloxy)biphenyl (9) (yield: 66.4%).

$^1$H-NMR δ (CDCl$_3$, ppm); 1.10–2.10 (m, 8H), 3.67 (m, 2H), 4.00 (t, 2H, J=6.2Hz), 6.96 (d, 2H, J=8.8Hz), 7.50 (d, 2H, J=8.8Hz), 7.65 (s, 4H).

IR (KBr, cm$^{-1}$); 3350 (—OH), 2945, 2860, 2220 (—CN), 1600, 1580, 1495, 1470, 1290, 1250, 1180, 1020, 1010, 820.

To a solution of 1.26 g (4.27 mmol) of the resulting compound (9) and 1.8 ml (24.8 mmol) of anhydrous triethylamine dissolved in 20 ml of tetrahydrofuran under argon atmosphere was added dropwise 5 ml of an tetrahydrofuran solution containing 0.38 ml (4.08 mmol) of acryloyl chloride. The whole was stirred at room temperature overnight, thereby a salt precipitated. After addition of water to the reaction mixture, the whole was extracted with diethyl ether. The extract was purified by silica gel column chromatography. The resulting pale yellow solid was recrystallized from methanol to obtain 1.01 g of 4-cyano-4'-(6-acryloxyhexyloxy)biphenyl (10) (yield: 67.7%).

$^1$H-NMR, δ (CDCl$_3$, ppm); 1.10–2.10 (m, 8H), 4.01 (t, 2H, J=6.2Hz), 4.11 (t, 2H, J=6.4Hz), 5.80 (dd, 1H, J=2.7, 9.7Hz), 6.10 (m, 1H), 6.40 (m, 1H), 6.98 (d, 2H, J=8.8Hz), 7.52 (d, 2H, J=8.8Hz), 7.66 (s, 4H).

IR (KBr, cm$^{-1}$); 2945, 2860, 2220 (—CN), 1715 (C=O), 1600, 1495, 1470, 1400, 1290, 1250, 1200, 1180, 1010, 1000, 820.

Reference Example 3

Synthesis of a monomer having a siloxane spacer

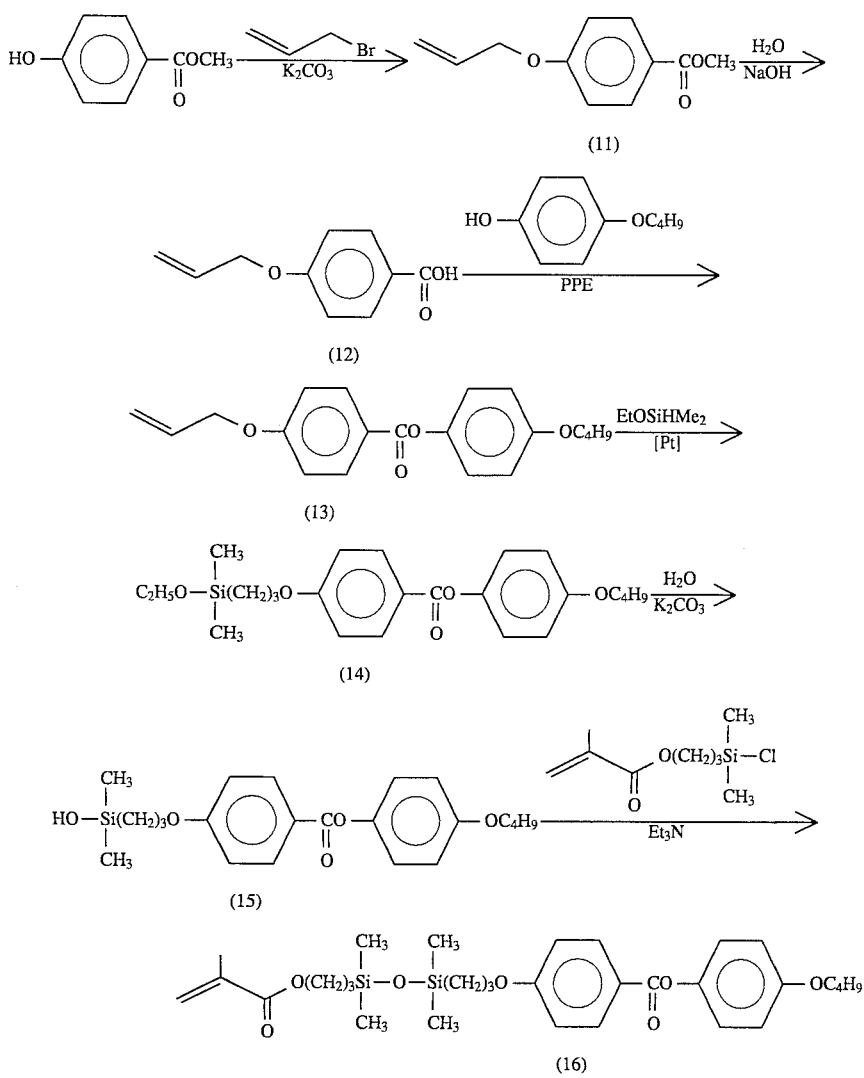

To a solution of 15.0 g (98.6 mmol) of methyl p-hydroxybenzoate and 13.0 g (94.1 mmol) of potassium carbonate mixed in 150 ml of acetone were added 13 ml (150 mmol) of allyl bromide and the whole was stirred at 80° C. for 2 hours under an argon gas atmosphere. Water was added to the solution and the whole was extracted with ethyl acetate. Then, the organic phase was washed with 5% aqueous solution of sodium hydroxide and saturated saline solution. After removal of the solvent by distillation, the residue was purified by silica gel column chromatography to obtain 18.6 g of methyl p-allyloxybenzoate (11) (yield: 96.6%).

$^1$H-NMR, δ (CDCl$_3$, ppm); 3.88 (s, 3H), 4.58 (d, 2H, J=5.0Hz), 5.37 (m, 2H), 5.86–6.22 (m, 1H), 6.92 (d, 2H, J=9.0Hz), 7.98 (d, $^2$H, J=9.0Hz).

IR (KBr, cm$^{-1}$); 2960, 1720 (C=O), 1610, 1510, 1435, 1280, 1255, 1170, 1110, 1020, 845, 770.

Mass (m/e); 192 (M$^+$), 161, 41 (CH$_2$=CHCH$_2$$^+$).

18.0 g (93.6 mmol) of the resulting compound (11) was dissolved in 600 ml of ethanol. The solution was poured into a solution of 12.0 g (300 mmol) of sodium hydroxide dissolved in 80 ml of water and 100 ml of methanol. The whole was refluxed at 80° C. for 2 hours. After removal of the solvent by distillation, the resulting white solid was dissolved in water and the solution was rendered acidic by adding hydrochloric acid, whereby white precipitate formed. The precipitate was extracted with methylene chloride. After removal of the solvent by distillation, the residue was purified by silica gel column chromatography to obtain 4.7 g of p-allyloxybenzoic acid (12) (yield: 88.1%).

$^1$H-NMR, δ (CDC$_3$, ppm); 4.56 (d, 2H, J=5.0Hz), 5.35 (m, 2H), 5.84–6.28 (m, 1H), 6.90 (d, 2H, J=9.0Hz), 7.95 (d, 2H, J=9.0Hz).

IR (KBr, cm$^{-1}$); 2450–3000 (COOH), 1680 (C=O), 1600, 1550, 1430, 1350, 1250, 1180, 1010, 1000, 930, 850, 770. Mass (m/e); 178 (M+), 41 (CH$_2$=CHCH$_2$+).

30.0 g of PPE, 5.00 g (28.1 mmol) of the compound (12) and 4.40 g (28.9 mmol) of p-butoxyphenol were dissolved in 100 ml of chloroform under an argon gas atmosphere and the whole was stirred at room temperature overnight. After addition of water to the reaction mixture, the whole was extracted with methylene chloride. After removal of the solvent by distillation, the residue was purified by silica gel column chromatography to obtain 8.30 g of p-butoxyphenyl p-allyloxybenzoate (13) (yield: 94.6%).

1H-NMR, δ (CDCl$_3$, ppm); 1.05 (t, 3H), 1.70–1.94 (m, 2H,), 3.93 (t, 2H, J=6.0Hz), 4.63 (d, 2H, J=5.0Hz), 5.39 (m, 2H), 5.88–6.13 (m, 1H), 6.85–7.16 (m, 6H), 8.14 (d, 2H, J=8.9Hz).

IR (KBr, cm$^{-1}$); 2950, 1725 (C=O), 1605, 1515, 1480, 1460, 1430, 1320, 1310, 1280, 1260, 1170, 1080, 1020, 940, 850, 800, 760.

Mass (m/e); 312 (M+), 279, 161, 41 ($CH_2=CHCH_2^+$).

6.00 g (18.4 mmol) of the resulting compound (13) and 3.60 ml (45.9 mmol) of dimethylethoxysilane were dissolved in 50 ml of tetrahydrofuran, and 0.10 ml of a methylene chloride solution (0.1 mol/l) of dicyclopentadienylplatinum dichloride was added thereto. The whole was stirred at 50° C. overnight. Removal of the solvent by distillation afforded p-butoxyphenyl p- (3-dimethylethoxysilylpropoxy) benzoate (14) as a crude product. Then, the product was again dissolved in 20 ml of tetrahydrofuran and an aqueous solution containing 20.0 g (145 mmol) of potassium carbonate and 10 ml of acetone were added thereto. The whole was stirred at room temperature for 4 days. The reaction mixture was poured into an excess of ice-water containing 8.0 g of potassium dihydrogen phosphate and the whole was extracted with methylene chloride. After removal of the solvent by distillation, the residue was purified by silica gel column chromatography to obtain 2.68 g of a silanol compound (15) (yield: 41.6% through two steps).

$^1$H-NMR, δ ($CDCl_3$, ppm); 0.19 (s, 6H), 0.72–1.05 (m, 5H), 1.36–2.00 (m, 6H), 3.90–4.12 (m, 4H), 6.86–7.16 (m, 6H), 8.13 (d, 2H, J=9.0Hz).

IR (KBr, $cm^{-1}$); 3250 (—OH), 2950, 1720 (C=O), 1600, 1500, 1260 (Si—C), 1180, 1160, 1080, 840, 760, 700. Mass (m/e); 388 ($M^+$), 237, 195, 121, 75 ($HOMe_2Si^+$).

To a solution 1.50 g (3.86 mmol) of the resulting compound (15) dissolved in 10 ml of tetrahydrofuran under an argon gas atmosphere were added 0.65 ml (4.66 mmol) of triethylamine and 1.00 g (4.53 mmol) of 3-methacryloxypropyldimethylchlorosilane and the whole was stirred at room temperature overnight. A white solid formed was filtrated off under washing with diethyl ether. After removal of the solvent by distillation, the residue was purified by silica gel column chromatography to obtain 2.00 g of the desired monomer (16) (yield: 90.5%).

$^1$H-NMR, δ ($CDCl_3$, ppm); 0.11 (s, 12H), 0.48–0.57 (m, 4H), 0.98 (t, 3H, J=6.9Hz), 1.44–1.88 (m, 8H), 1.95 (s, 3H), 3.89–4.20 (m, 6H), 5.54 (s, 1H), 6.11 (s, 1H), 6.85–7.14 (m, 6H), 8.14 (d, 2H).

IR (KBr, $cm^{-1}$); 2990, 2900, 1740 (C=O), 1650, 1615, 1520, 1260 (Si—C), 1170, 1080, 1055(SiOSi), 850, 800. Mass (m/e); 572 ($M^+$), 421, 279, 217, 69 ($CH_2=C(CH_3)CO^+$), 41 ($CH_2=C(CH_3)^+$).

Reference Example 4

Synthesis of a monomer having a siloxane spacer

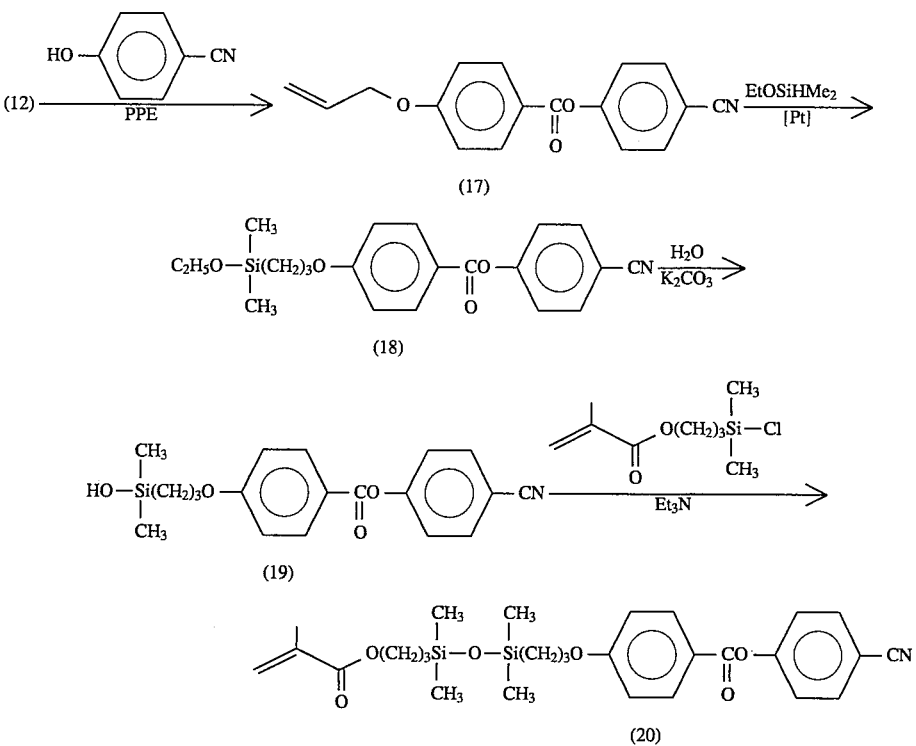

15.0 g of PPE, 4.00 g (22.4 mmol) of the compound (12) and 2.66 g (22.3 mmol) of p-cyanophenol were dissolved in ml of chloroform under an argon gas atmosphere and the whole was stirred at room temperature overnight. After addition of water to the reaction mixture, the whole was extracted with methylene chloride. After removal of the solvent by distillation, the residue was purified by silica gel column chromatography to obtain 4.80 g of p-cyanophenyl p-allyloxybenzoate (17) as a white solid (yield: 76.7%).

$^1$H-NMR, δ ($CDCl_3$, ppm); 4.63 (d, 2H, J=5.0Hz), 5.39 (m, 2H), 5.88–6.24(m, 1H), 7.01 (d, 2H, J=8.8Hz), 7.34 (d, 2H, J=8.8Hz), 7.73 (d, 2H, J=8.8Hz), 8.13 (d, 2H, J=8.8Hz). IR (KBr, $cm^{-1}$); 2960, 2230 (—CN), 1720 (C=O), 1600, 1580, 1500, 1450, 1420, 1325, 1310, 1260, 1200, 1180, 1060, 990, 920, 880, 840, 755.

Mass spectrum (m/e); 279 ($M^+$), 161, 41 ($CH_2=CHCH_2^+$).

1.90 g (5.72 mmol) of the resulting compound (17) and 2.50 ml (18.2 mmol) of dimethylethoxysilane were dissolved in 30 ml of tetrahydrofuran and 0.20 ml of a methylene chloride solution (0.1 mol/l) of dicyclopentadienylplatinum dichloride was added thereto. The whole was stirred at 50° C. for 3 hours under an argon gas atmosphere.

After removal of the solvent by distillation, the residue was purified by silica gel column chromatography to obtain 1.80 g of p-cyanophenyl p-(3-dimethylethoxysilylpropoxy) benzoate (18) as a colorless clear liquid (yield: 72.9%).

$^1$H-NMR, δ (CDCl$_3$, ppm); 0.14 (s, 6H), 0.63–0.82 (m, 2H), 1.19 (t, 3H), 1.60–1.98 (m, 2H), 3.68 (q, 2H), 4.03 (t, 2H), 6.97 (d, 2H, J=8.8Hz), 7.34 (d, 2H, J=8.8Hz), 7.72 (d, 2H, J=8.8Hz), 8.12 (d, 2H, J=8.8Hz).

IR (KBr, cm$^{-1}$); 3000, 2960, 2890, 2200 (—CN), 1730 (C=O), 1600, 1580, 1510, 1475, 1420, 1410, 1390, 1260 (Si—C), 1200, 1150, 1040, 990, 940, 880, 840, 800, 770, 750.

Mass (m/e); 368 (M$^+$—Me), 326, 265, 145, 121, 103 (EtOMe$_2$Si$^+$).

A solution of 1.75 g of the product (18) dissolved in 35 ml of acetone was poured into a solution of 1.5 g (10.9 mmol) of potassium carbonate dissolved in 25 ml of water and 60 ml of acetone. Then, an aqueous solution of 1.5 g (10.9 mmol) of potassium carbonate dissolved in 45 ml of water was added thereto. The whole was stirred at room temperature for 2 hours. The reaction mixture was poured into an excess of ice-water containing 5.0 g of potassium dihydrogen phosphate and the whole was extracted with methylene chloride. After removal of the solvent by distillation, the residue was purified by silica gel column chromatography to obtain 1.40 g of a silanol compound (19) as a white solid (yield: 86.4%).

$^1$H-NMR, δ (CDCl$_3$, ppm); 0.19 (s, 6H), 0.67–0.89 (m, 2H), 1.70 (s, 1H), 1.83–2.02 (m, 2H), 3.67 (t, 2H, J=6.1Hz), 6.98 (d, 2H, J=8.9Hz), 7.35 (d, 2H, J=8.8Hz), 7.73 (d, 2H, J=8.9Hz), 8.12 (d, 2H, J=8.8Hz). IR (KBr, cm$^{-1}$); 3500 (—OH), 2950, 2880, 2240 (—CN), 1930, 1720 (C=O), 1600, 1510, 1470, 1410, 1390, 1320, 1250 (Si—C), 1200, 1150, 1040, 1000, 870, 820, 760.

Mass (m/e); 355 (M$^+$), 340 (M$^+$–Me), 237, 195, 121, 75 (HOMe$_2$Si$^+$).

To a solution of 1.25 g (3.52 mmol) of the resulting compound (19) dissolved in 15 ml of tetrahydrofuran under an argon gas atmosphere were added 1.00 ml (7.17 mmol) of triethylamine and 0.93 g (4.22 mmol) of 3-methacryloxypropyldimethylchlorosilane and the whole was stirred at room temperature overnight. A white salt formed was filtrated off under washing with diethyl ether. After removal of the solvent by distillation, the residue was purified by silica gel column chromatography to obtain 1.72 g of the desired monomer (20) as a white solid (yield: 90.5%).

$^1$H-NMR, δ (CDCl$_3$, ppm); 0.10 (s, 12H), 0.53–0.75 (m, 4H), 1.61–1.96 (m, 4H), 1.94 (s, 3H), 4.03 (t, 2H, J=6.0Hz), 4.31 (t, 2H, J=6.2Hz), 5.53 (s, 1H), 6.10 (s, 1H), 6.98 (d, 2H, J=8.8Hz), 7.35 (d, 2H, J=8.9Hz), 7.73 (d, 2H, J=8.8Hz), 8.12 (d, 2H, J=8.9Hz).

IR (KBr, cm$^{-1}$); 2950, 2900, 2250 (—CN), 1740 (C=O), 1720, 1600, 1510, 1320, 1300, 1255 (Si—C), 1210, 1160, 1060 (SiOSi), 1000, 840, 800.

Mass (m/e); 524 (M$^+$—Me), 482, 440, 421, 217, 121, 69 (CH$_2$=C (CH$_3$) COO$^+$), 41 (CH$_2$=C (CH$_3$)$^+$).

Reference Example 5

Synthesis of a monomer having a siloxane spacer

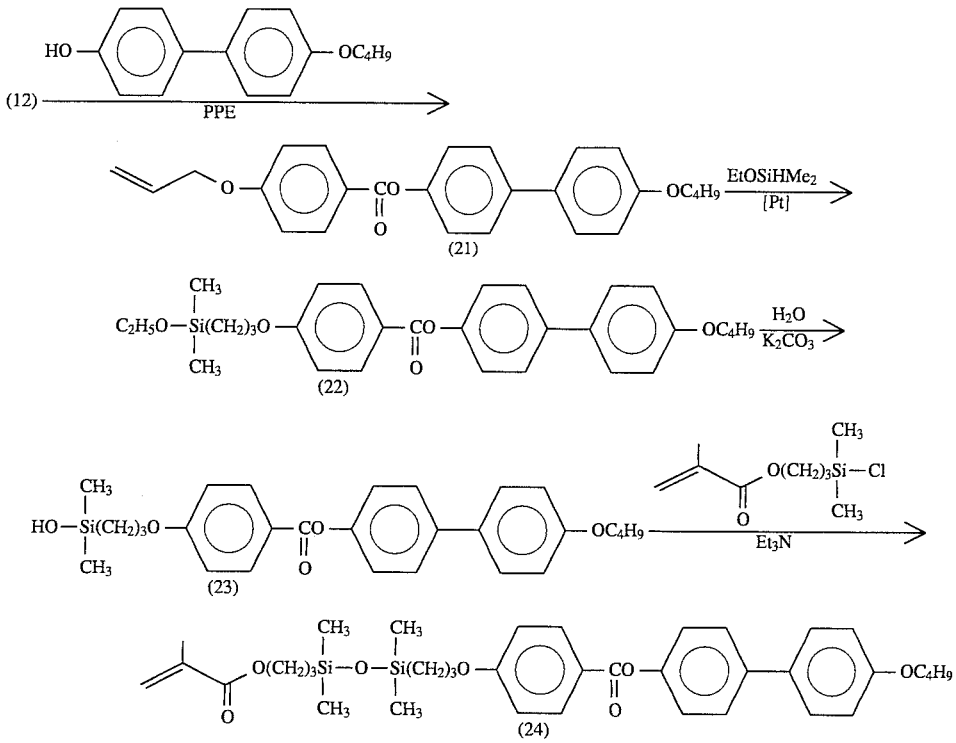

20.0 g of PPE, 4.86 g (27.3 mmol) of the compound (12) and 6.60 g (27.3 mmol) of 4-butoxy-4'-hydroxybiphenyl were dissolved in 100 ml of chloroform under an argon gas atmosphere and the whole was stirred at room temperature overnight. After addition of water to the reaction mixture, the whole was extracted with methylene chloride. After removal of the solvent by distillation, the residue was purified by silica gel column chromatography to obtain 9.15 g of 4-(4'-butoxybiphenyl) p-allyloxybenzoate (21) as a white solid (yield: 83.4%).

$^1$H-NMR δ (CDCl$_3$, ppm); 0 98 (t, 3H, J=6 3Hz), 1.38–1.89 (m, 4H), 4.01 (t, 2H, J=6.0Hz), 4.64 (d, 2H, J=5.0Hz), 5.45 (m, 2H), 5.94–6.13 (m, 1H), 6.96 (d, 2H, J=8.8Hz), 7.00 (d, 2H, J=8.8Hz), 7.24 (d, 2H, J=8.8Hz), 7.50 (d, 2H, J=8.9Hz), 7.58 (d, 2H, J=8.8Hz), 8.16 (d, 2H, J=8.9Hz).

IR (KBr, cm$^{-1}$); 2960, 2940, 2880, 1720 (C=O), 1600, 1510, 1470, 1320, 1245, 1210, 1160, 1070, 1040, 940, 840, 810, 760.

Mass (m/e); 402 (M$^+$), 161, 41 (CH$_2$=CHCH$_2^+$).

8.75 g (21.0 mmol) of the resulting compound (21) and 7.30 ml (53.0 mmol) of dimethylethoxysilane were dissolved in 100 ml of tetrahydrofuran and 0.50 ml of a methylene chloride solution (0.1 mol/l) of dicyclopentadienylplainum dichloride was added thereto. The whole was stirred at 50° C. for 3 hours under an argon gas atmosphere. Removal of the solvent by distillation afforded 4-(4'-butoxybiphenyl) p-(3-dimethylethoxysilylpropoxy)benzoate (22) as a crude product. Then, the product was dissolved in 35 ml of acetone and 50 ml of tetrahydrofuran and the solution was poured into a solution of 9.0 g (65.1 mmol) of potassium carbonate dissolved in 15 ml of water and 45 ml of acetone. Further, a solution of 9.0 g (65.1 mmol) of potassium carbonate dissolved in 45 ml of water was added thereto. The whole was stirred at room temperature for 8 hours. The reaction mixture was poured into an excess of ice-water containing 30 g of potassium dihydrogen phosphate and the whole was extracted with methylene chloride. After removal of the solvent by distillation, the residue was purified by silica gel column chromatography to obtain 4.38 g of a silanol compound (23) as a white solid (yield: 42.2% through two steps).

Mass (m/e); 478 (M$^+$), 416, 362, 242, 186, 121, 75 (HOMe$_2$Si$^+$).

To a solution 3.90 g (8.15 mmol) of the resulting compound (23) dissolved in 30 ml of tetrahydrofuran under an argon gas atmosphere were added 3.27 ml (23.7 mmol) of triethylamine and 2.10 g (9.46 mmol) of 3-methacryloxypropyldimethylchlorosilane and the whole was stirred at room temperature overnight. A white salt formed was filtrated off under washing with diethyl ether. After removal of the solvent by distillation, the residue was purified by silica gel column chromatography to obtain 3.00 g of the desired monomer (24) as a white solid (yield: 55.5%).

$^1$H-NMR, δ (CDCl$_3$, ppm); 0.10 (s, 12H), 0.54–0.86 (m, 4H), 1.00 (t, 3H, J=6.5Hz), 1.20–1.90 (m, 4H), 1.94 (d, 3H, J=5.0Hz), 4.02 (t, 4H, J=7.1Hz), 4.11 (t, 2H, J=7.1Hz), 5.54 (s, 1H), 6.10 (s, 1H), 6.97 (d, 4H, J=8.8Hz), 7.27 (d, 2H, J=8.8Hz), 7.51 (d, 2H, J=8.8Hz), 7.58 (d, 2H, J=8.9Hz), 8.16 (d, 2H, J=8.9Hz).

IR (KBr, cm$^{-1}$); 2960, 2940, 2880, 1730 (C=O), 1605, 1500, 1470, 1320, 1290, 1250 (Si—C), 1215, 1170, 1070 (SiOSi), 1040, 1010, 970, 900, 840, 810.

Mass (m/e); 662 (M$^+$), 493, 421, 379, 337, 242, 217, 121, 69 (CH$_2$=C (CH$_3$) COO$^+$), 41 (CH$_2$=C (CH$_3$)$^+$).

Reference Example 6

Synthesis of a monomer having a siloxane spacer

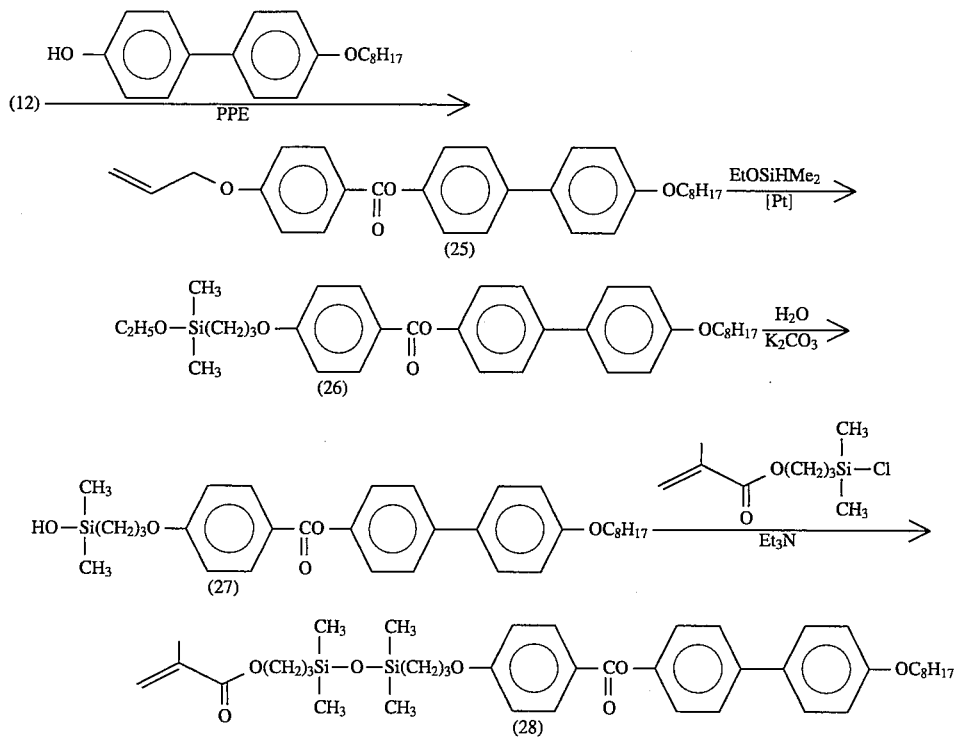

$^1$H-NMR, δ (CDCl$_3$, ppm); 0.12 (s, 6H), 0.52–0.82 (m, 2H), 0.98 (t, 3H, J=6.5Hz), 1.12–1.92 (m, 7H), 3.97 (t, 2H, J=7.0Hz), 4.00 (t, 2H, J=7.1Hz), 6.92 (d, 4H, J=8.8Hz), 7.20 (d, 2H, 8.9Hz), 7.84 (d, 2H, J=8.8Hz), 7.92 (d, 2H, J=8.9Hz), 8.10 (d, 2H, J=8.8Hz).

IR (KBr, cm$^{-1}$); 3400 (—OH), 2960, 2940, 2880, 1740 (C=O), 1720, 1620, 1510, 1490, 1440, 1410, 1260 (Si—C), 1220, 1175, 1090, 1060, 1010, 990, 900, 840, 820, 780.

15.0 g of PPE, 2.65 g (15.2 mmol) of the compound (12) and 4.50 g (13.4 mmol) of 4-octyloxy-4'-hydroxybiphenyl were dissolved in 120 ml of chloroform under an argon gas atmosphere and the whole was stirred at room temperature overnight. After addition of water to the reaction mixture, the whole was extracted with methylene chloride. After removal of the solvent by distillation, the residue was purified by silica gel column chromatography to obtain 5.30 g of 4-(4'-octyloxybiphenyl p-allyloxybenzoate (25) as a white solid (yield: 86.2%).

¹H-NMR, δ (CDCl₃, ppm); 0.73 (t, 3H, J=6.9H), 1.00–1.85 (m, 12H), 3.96 (t, 2H, J=6.4Hz), 4.60 (d, 2H, J=5.1Hz), 5.39 (m, 2H), 5.85–6.23 (m, 1H), 6.93 (d, 2H, J=8.8 Hz), 6.97 (d, 2H, J=9.0Hz), 7.20 (d, 2H, J=8.8 Hz), 7.47 (d, 2H, J=8.8 Hz), 7.55 (d, 2H, J=8.8 Hz), 8.13 (d, 2H, J=9.0Hz).

IR (KBr, cm⁻¹); 2960, 2930, 2850, 1725 (C=O), 1610, 1500, 1470, 1310, 1290, 1250, 1215, 1165, 1080, 1010, 995, 930, 880, 840, 800, 760, 690.

Mass (m/e); 458 (M⁺), 298, 161, 41 (CH₂=CHCH₂⁺).

5.00 g (10.9 mmol) of the resulting compound (25) and 2.5 ml (18.2 mmol) of dimethylethoxysilane were dissolved in 50 ml of tetrahydrofuran and 0.20 ml of a methylene chloride solution (0.1 mol/l) of dicyclopentadienylplatinum dichloride was added thereto. The whole was stirred at 50° C. for 3 hours under an argon gas atmosphere. Removal of the solvent by distillation afforded 4-(4'-octyloxybiphenyl) p-(3-dimethylethoxysilylpropoxy) benzoate (26) as a crude product. Then, the product was dissolved in 40 ml of acetone and 60 ml of tetrahydrofuran, and the solution was poured into a solution of 3.5 g (25.3 mmol) of potassium carbonate dissolved in 50 ml of water and 120 ml of tetrahydrofuran. Further, a solution of 3.5 g (25.3 mmol) of potassium carbonate dissolved in 100 ml of water was added thereto. The whole was stirred at room temperature for 2 hours. The reaction mixture was poured into an excess of ice-water containing 12 g of potassium dihydrogen phosphate and the whole was extracted with methylene chloride. After removal of the solvent by distillation, the residue was purified by silica gel column chromatography to obtain 4.01 g of a silanol compound (27) as a white solid (yield: 68.8% through two steps).

¹H-NMR, δ (CDCl₃, ppm); 0.20 (s, 6H), 0.58–0.70 (m, 2H), 0.75 (t, 3H, J=6.4Hz), 1.20–2.10 (m, 15H), 4.01 (t, 2H, J=6.4Hz), 4.06 (t, 2H, J=6.7Hz), 6.98 (d, 4H, J=8.8Hz), 7.25 (d, 2H, J=9.0Hz), 7.52 (d, 2H, J=8.8Hz), 7.59 (d, 2H, J=8.8Hz), 8.17 (d, 2H, J=9.0Hz).

IR (KBr, cm⁻¹); 3280 (—OH), 2960, 2940, 2860, 1740 (C=O), 1610, 1510, 1500, 1470, 1400, 1250 (Si—C), 1220, 1160, 1075, 1040, 1000, 890, 840, 800, 760, 680.

Mass (m/e); 534 (M⁺), 418, 298, 237, 195, 121, 75 (HOMe₂Si⁺).

To a solution 3.60 g (6.73 mmol) of the compound (27) dissolved in 25 ml of tetrahydrofuran under an argon gas atmosphere were added 2.00 ml (14.3 mmol) of triethylamine and 1.48 g (6.71 mmol) of 3-methacryloxypropyldimethylchlorosilane and the whole was stirred at room temperature overnight. A white salt formed was filtrated off under washing with diethyl ether. After removal of the solvent by distillation, the residue was purified by silica gel column chromatography to obtain 2.01 g of the desired monomer (28) as a white solid (yield: 38.2%).

¹H-NMR, δ (CDCl₃, ppm); 0.11 (s, 12H), 0.32–0.65 (m, 4H), 0.75 (t, 3H, J=6.4Hz), 1.10–1.90 (m, 16H), 1.95 (s, 3H), 4.00–4.15 (m, 6H), 5.54 (s, 1H), 6.11 (s, 1H), 6.97 (d, 4H, J=8.8Hz), 7.24 (d, 2H, J=9.0Hz), 7.51 (d, 2H, J=8.8Hz), 7.59 (d, 2H, J=8.8Hz), 8.16 (d, 2H, J=9.0Hz).

IR (KBr, cm⁻¹); 3000, 2950, 2900, 1730 (C=O), 1610, 1510, 1500, 1260 (Si—C), 1210, 1170, 1070, 1070 (SiOSi), 900, 840, 820, 770.

Mass (m/e); 719 (M⁺) 549 421 379 298 217 121 69 (CH₂=C (CH₃) COO³⁰), 41 (CH₂=C (CH₃)⁺)

Reference Example 7

Synthesis of a monomer having a siloxane spacer

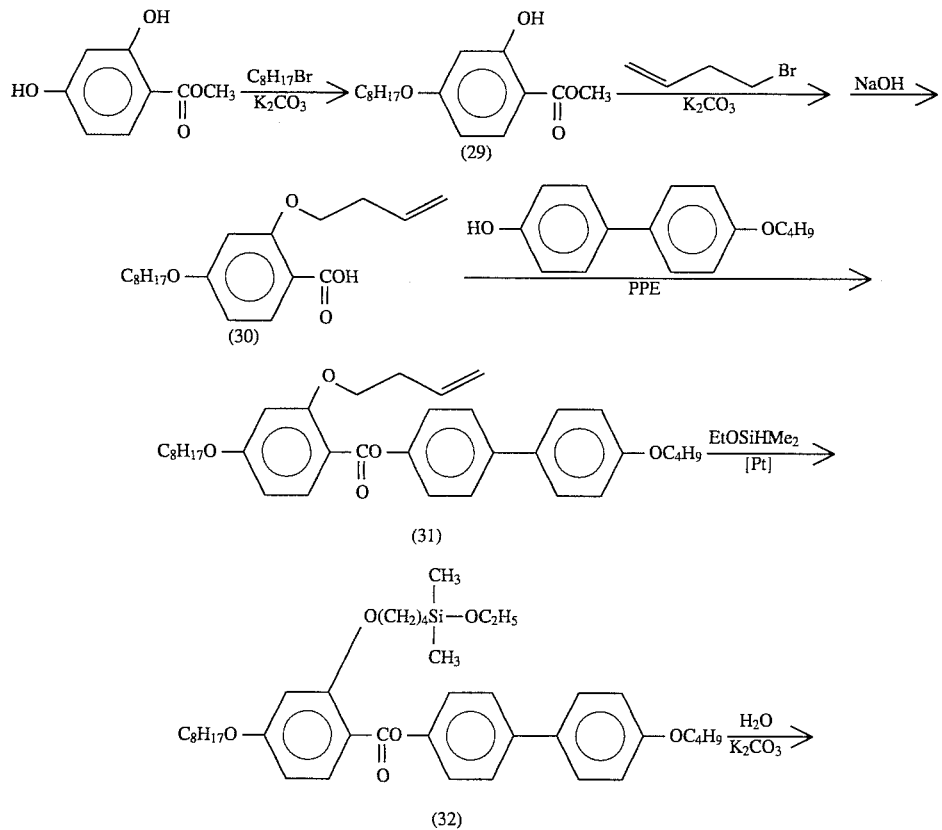

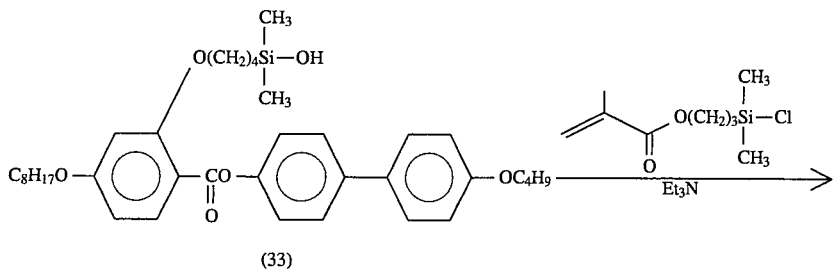

(33)

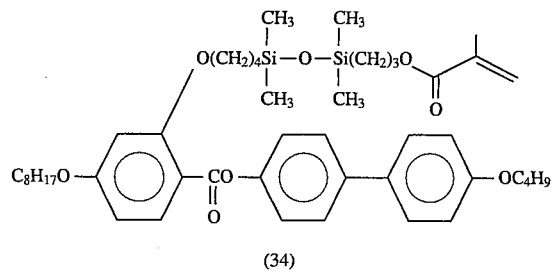

(34)

To a solution of 33.0 g (196 mmol) of methyl 2,4-dihydroxybenzoate and 68.0 g (491 mmol) of potassium carbonate mixed in 500 ml of 2-butanone was added 50 ml (235 mmol) of octyl bromide and the whole was refluxed for 18 hours. Water was added to the solution and the whole was extracted with ethyl acetate. After removal of the solvent by distillation, the residue was purified by silica gel column chromatography to obtain 40.4 g of methyl 2-hydroxy-4-octyloxybenzoate (29) as a colorless clear liquid (yield: 73.5%).

$^1$H-NMR, δ(CDCl$_3$, ppm); 0.81–0.94 (m, 3H), 1.18–1.98 (m, 12H), 3.90 (s, 3H), 3.97 (t, 2H, J=6.0Hz), 6.35–6.49 (m, 2H), 7.66–7.77 (m, 1H).

IR (KBr, cm$^{-1}$); 3080 (—OH), 2930, 2860, 1730(C=O), 1700, 1605, 1570, 1505, 1470, 1440, 1380, 1270, 1190, 1140, 1090, 1030, 920, 830, 770.

To a solution of 22.0 g (78.5 mmol) of the compound (29) and 65.0 g (471 retool) of potassium carbonate mixed in 300 ml of 2-butanone were added 32.0 g (236 mmol) of butenyl bromide and the whole was refluxed for 18 hours. Water was added to the solution and the whole was extracted with ethyl acetate. After removal of the solvent by distillation, the residue was purified by silica gel column chromatography to obtain 23.6 g of methyl 2-butenyloxy-4-octyloxybenzoate as a colorless clear liquid (yield: 89.9%). Then, 20.0 g (59.8 mmol) of the resulting compound was dissolved in 100 ml of methanol. The solution was poured into a solution of 12.0 g (300 mmol) of sodium hydroxide dissolved in 40 ml of water and 400 ml of methanol. The whole was refluxed for another 2 hours. After removal of the solvent by distillation, the resulting white solid was dissolved in water and the solution was rendered acidic by adding hydrochloric acid, whereby white precipitate formed. The precipitate was extracted with methylene chloride. After removal of the solvent by distillation, the residue was purified by silica gel column chromatography to obtain 15.3 g of 2-butenyloxy-4-octyloxybenzoic acid (30) (yield: 80.0%).

$^1$H-NMR, δ (CDCl$_3$, ppm); 0.80–0.96 (m, 3H), 1.23–1.68 (m, 12H), 2.69 (q, 2H, J=6.3Hz), 4.01 (t, 2H, J=6.3Hz), 4.26 (t, 2H, J=6.3Hz), 5.14–5.35 (m, 2H), 5.73–5.84 (m, 1H), 6.49–6.68 (m, 2H), 8.11 (d, 1H, J=8.8Hz).

IR (KBr, cm$^{-1}$); 3400 (—OH), 2920, 2860, 1730(C=O), 1610, 1580, 1510, 1490, 1450, 1360, 1260, 1200, 1180, 1070, 1030, 945, 880, 830, 780.

20.0 g of PPE, 4.00 g (28.1 mmol) of the compound (30) and 3.00 g (12.5 mmol) of 4-butoxy-4'-hydroxybiphenyl were dissolved in 80 ml of chloroform under an argon gas atmosphere and the whole was stirred at 60° C. for 3 days. After addition of water to the reaction mixture, the whole was extracted with methylene chloride. After removal of the solvent by distillation, the residue was purified by silica gel column chromatography to obtain 6.28 g of 4-(4'-butoxybiphenyl) 2-(3-butenyloxy)-4-octyloxybenzoate (31) (yield: 91.4%).

$^1$H-NMR, δ (CDCl$_3$, ppm); 0.80–1.09 (m, 6H), 1.09–1.53 (m, 16H), 2.61 (q, 2H, J=6.6Hz), 3.85 (s, 2H), 4.06 (t, 4H, J=6.7Hz), 5.01–5.24 (m, 2H), 5.78–6.14 (m, 1H), 6.50–6.61 (m, 2H), 6.97 (d, 2H, J=8.8Hz), 7.23 (d, 2H, J=8.6Hz), 7.47–7.61 (m, 4H), 8.03 (d, 1H, J=9.2Hz).

IR (KBr, cm$^{-1}$); 2930, 2860, 1740 (C=O), 1610, 1570, 1500, 1470, 1430, 1390, 1330, 1270, 1250, 1210, 1170, 1150, 1070, 1040, 1000, 910, 875, 830, 800, 760.

Mass (m/e); 544 (M$^+$), 303, 185, 137, 55 (CH$_2$=CHCH$_2^+$).

4.10 g (7.60 mmol) of the resulting compound (31) and 1.20 ml (9.12 mmol) of dimethylethoxysilane were dissolved in 50 ml of tetrahydrofuran and 0.10 ml of a methylene chloride solution (0.1 mol/1) of dicyclopentadienylplatinum dichloride was added thereto. The whole was stirred at 60° C. overnight. Removal of the solvent by distillation afforded an ethoxysilyl compound (32) as a crude product. Then, the product was again dissolved in 20 ml of tetrahydrofuran, and an aqueous solution containing 5.20 g (30.4 mmol) of potassium carbonate and 10 ml of acetone were added thereto. The whole was stirred at room temperature for 3 days. The reaction mixture was poured into an excess of ice-water containing 8.0 g of potassium dihydrogen phosphate and the whole was extracted with methylene chloride. After removal of the solvent by distillation, the residue was purified by silica gel column chromatography to obtain 1.68 g of a silanol compound (33) (yield: 35.7% through two steps).

$^1$H-NMR, 5 (CDCl$_3$, ppm); 0.11 (s, 6H), 0.50–0.72 (m, 2H), 0.89–0.96 (m, 6H), 1.24–2.15 (m, 20H), 3.95–4.05 (m, 6H), 6.50–6.60 (m, 2H), 6.98 (d, 2H, J=8.8Hz), 7.24 (d, 2H, J=8.6Hz), 7.45–7.60 (m, 4H), 8.04 (d, 1H, J=9.2Hz).

IR (KBr, cm$^{-1}$); 3380 (—OH), 2930, 2860, 1745 (C=O), 1610, 1570, 1500, 1470, 1435, 1390, 1250 (Si—C), 1210, 1170, 1150, 1035, 1000, 970, 880, 830, 800, 760.

To a solution 1.10 g (1.78 mmol) of the resulting compound (33) dissolved in 25 ml of tetrahydrofuran under an argon gas atmosphere were added 0.50 ml (3.60 mmol) of triethylamine and 0.50 g (2.16 mmol) of 3-methacryloxypropyldimethylchlorosilane and the whole was stirred at room temperature overnight. A white salt formed was filtrated off under washing with diethyl ether. After removal of the solvent by distillation, the residue was purified by silica gel column chromatography to obtain 0.75 g of the desired monomer (34) (yield: 51.4%).

$^1$H-NMR, δ (CDCl$_3$, ppm); 0.02 (s, 6H), 0.05 (s, 6H), 0.45–0.65 (m, 4H), 0.85–1.93 (m, 22H), 1.95 (s, 3H), 3.95–4.15 (m, 8H), 5.54 (s, 1H), 6.10 (s, 1H), 6.50–6.60 (m, 2H), 6.98 (d, 2H, J=8.8Hz), 7.24 (d, 2H, J=8.6Hz), 7.45–7.60 (m, 4H), 8.04 (d, 1H, J=9.2Hz).

IR (KBr, cm$^{-1}$); 2930, 2870, 1745 (C=O), 1720, 1610, 1570, 1500, 1499, 1435, 1390, 1300, 1250 (Si—C), 1205, 1170, 1045, 1000, 970, 880, 800, 760.

Mass (m/e); 804 (M$^+$–Me), 677, 637, 565, 563, 242, 217, 186, 137, 69 (CH$_2$=C (CH$_3$) CO$^+$), 41 (CH$_2$=C (CH$_3$) +).

Reference Example 8

Synthesis of a monomer having a siloxane spacer

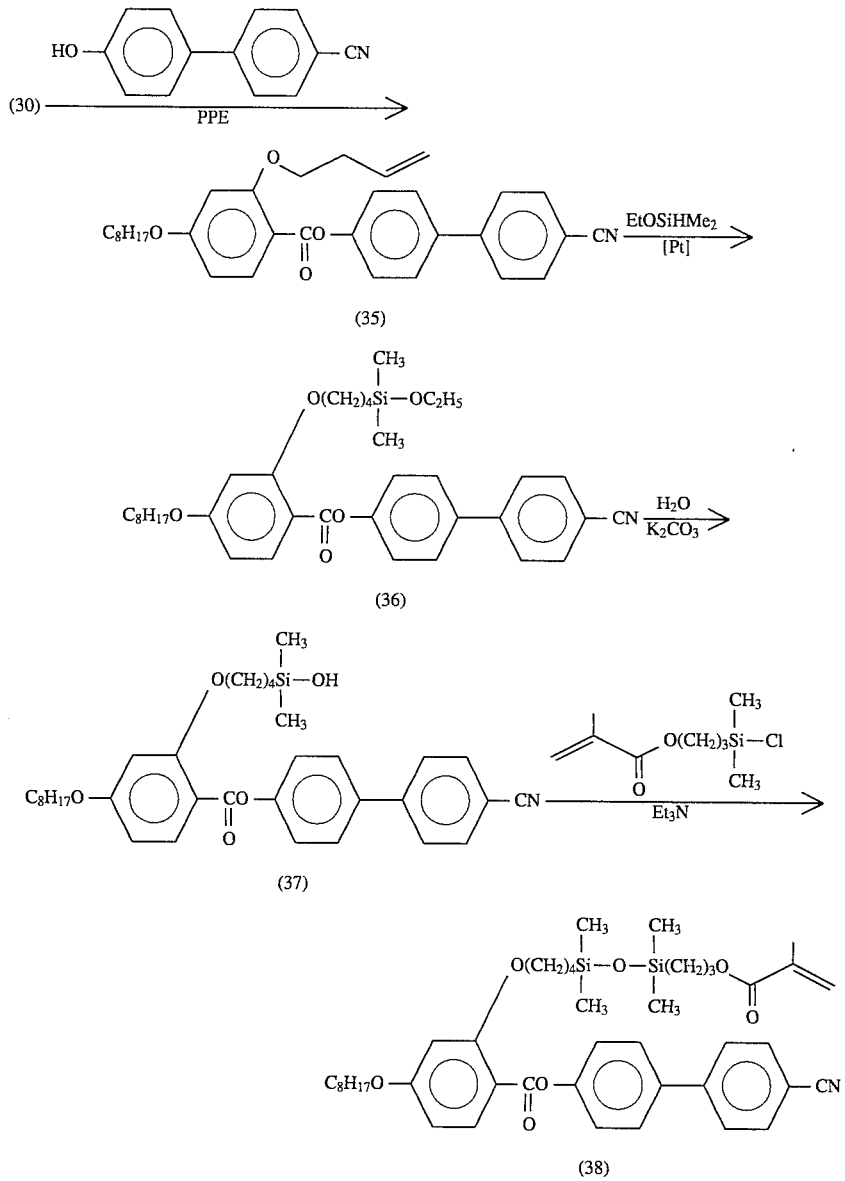

23.0 g of PPE, 5.00 g (15.6 mmol) of the compound (30) and 3.10 g (15.6 mmol) of 4-cyano-4'-hydroxybiphenyl were dissolved in 200 ml of chloroform under an argon gas atmosphere and the whole was stirred at 60° C. for 3 days. After addition of water to the reaction mixture, the whole was extracted with methylene chloride. After removal of the solvent by distillation, the residue was purified by silica gel column chromatography to obtain 7.00 g of 4-(4'-cyanobiphenyl) 2-(3-butenyloxy)-4-octyloxybenzoate (35) (yield: 93.6%).

$^1$H-NMR, δ (CDCl$_3$, ppm); 0.80–1.03 (m, 6H), 1.03–1.93 (m, 12H), 2.69 (q, 2H, J=6.5Hz), 4.06 (t, 2H, J=6.5Hz), 4.14 (t, 2H, J=6.3Hz), 5.17–5.30 (m, 2H), 5.80–6.17 (m, 1H), 6.54–6.66 (m, 2H), 7.33 (d, 2H, J=8.6Hz), 7.65 (m, 2H, J=8.9Hz), 7.72 (s, 4H), 8.07 (d, 1H, J=8.8Hz).

IR (KBr, cm$^{-1}$); 2930, 2850, 2220 (—CN), 1740 (C=O), 1605, 1570, 1490, 1460, 1435, 1390, 1310, 1220, 1200, 1140, 1030, 1000, 920, 835, 800, 760.

4.00 g (8.34 mmol) of the resulting compound (35) and 2.90 ml (20.8 mmol) of dimethylethoxysilane were dissolved in 30 ml of tetrahydrofuran and 0.10 ml of a methylene chloride solution (0.1 mol/1) of dicyclopentadienylplatinum dichloride was added thereto. The whole was stirred at 60° C. overnight. Removal of the solvent by distillation afforded an ethoxysilyl compound (36) as a crude product. Then, the product was again dissolved in 20 ml of tetrahydrofuran, and an aqueous solution containing 1.20 g (33.4 mmol) of potassium carbonate and 10 ml of acetone were added thereto. The whole was stirred at room temperature for 3 days. The reaction mixture was poured into an excess of ice-water containing 8.0 g of potassium dihydrogen phosphate and the whole was extracted with methylene chloride. After removal of the solvent by distillation, the residue was purified by silica gel column chromatography to obtain 2.10 g of a silanol compound (37) (yield: 44.0% through two steps).

1H-NMR, δ (CDCl$_3$, ppm); 0.11 (s, 6H), 0.48–0.72 (m, 2H), 0.90–0.96 (m, 3H), 1.24–2.17 (m, 16H), 3.96–4.04 (m, 4H), 6.50–6.58 (m, 2H), 7.31 (d, 2H, J=8.4Hz), 7.62 (d, 2H, J=8.8Hz), 7.72 (s, 4H), 8.04 (d, 1H, J=9.2Hz).

IR (KBr, cm$^{-1}$); 3400 (—OH), 2930, 2230 (—CN), 1720 (C=O), 1570, 1490, 1470, 1435, 1390, 1250 (Si-C), 1200, 1170, 1030, 1000, 840.

To a solution of 1.90 g (3.32 mmol) of the resulting compound (37) dissolved in 50 ml of tetrahydrofuran under an argon gas atmosphere were added 0.95 ml (6.84 mmol) of triethylamine and 0.91 g (4.10 mmol) of 3-methacryloxypropyldimethylchlorosilane and the whole was stirred at room temperature overnight. A white salt formed was filtrated off under washing with diethyl ether. After removal of the solvent by distillation, the residue was purified by silica gel column chromatography to obtain 1.33 g of the desired monomer (38) (yield: 52.8%).

1H-NMR, δ (CDCl$_3$, ppm); 0.02 (s, 6H), 0.05 (s, 6H), 0.43–0.65 (m, 4H), 0.85–1.84 (m, 18H), 1.94 (s, 3H), 3.97–4.16 (m, 6H), 5.54 (s, 1H), 6.10 (s, 1H), 6.51–6.59 (m, 2H), 7.31 (d, 2H, J=8.8Hz), 7.62 (d, 2H, J=8.8Hz), 7.72 (s, 4H), 8.04 (d, 1H, J=9.2Hz ).

IR (KBr, cm$^{-1}$); 2930, 2860, 2230 (=CN), 1720 (C=O), 1610, 1570, 1490, 1470, 1435, 1390, 1300, 1250 (Si—C), 1200, 1170, 1040, 1000, 940, 840, 740.

Reference Example 9

Synthesis of a monomer having a siloxane spacer

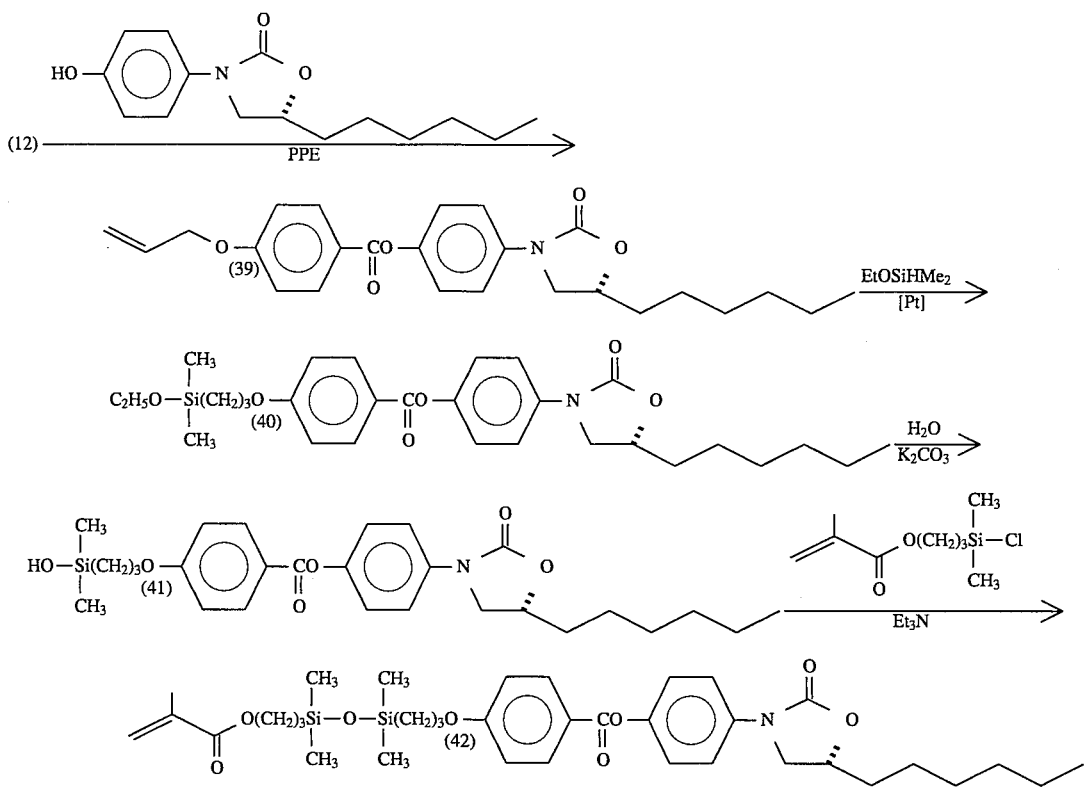

7.85 g (29.8 mmol) of (5R) -3- (4-hydroxyphenyl) -5-hexyl-2-oxazolidone prepared according to the method described in a reference (Japanese Patent Application Laied-open No. 151371/1991), 32.0 g of PPE and 5.32 g (29.9 mmol) of the compound (12) were dissolved in 120 ml of chloroform under an argon gas atmosphere and the whole was stirred at room temperature overnight. After addition of water to the reaction mixture, the whole was extracted with methylene chloride. After removal of the solvent by distillation, the residue was purified by silica gel column chromatography to obtain 10.2 g of 4-((5R)-3-(5-hexyl-2-oxazolidonyl)phenyl) 4-allyloxybenzoate (39) as a white solid (yield: 80.8%).

1H-NMR, δ (CDCl$_3$, ppm); 0.80–1.10 (m, 3H), 1.12–2.05 (m, 10H), 3.58 (dd, 1H, J=8.6, 7.2Hz), 4.02 (d, 1H, J=8.5Hz), 4.56 (dt, 2H, J=1.3, 4.9Hz), 4.51–4.92 (m, 1H), 5.31–5.58 (m, 2H), 5.71–6.44 (m, 1H), 6.92 (d, 2H, J=9.0Hz), 7.13 (d, 2H, J=9.2Hz), 7.52 (d, 2H, J=9.0Hz), 8.07 (d, 2H, J=9.0Hz). IR (KBr, cm$^{-1}$); 2950, 2900, 2850, 1720 (C=O), 1600, 1520, 1460, 1430, 1410, 1280, 1250, 1220, 1170, 1140, 1120, 1080, 1010, 980, 910, 870, 840, 750, 680, 520.

Mass (m/e); 423 (M$^+$), 218, 161, 41 (CH$_2$=CHCH$_2{}^+$). $[\alpha]_D{}^{20}$=13.4 (c=1.29, CHCl$_1$).

8.30 g (19.5 mmol) of the resulting compound (39) and 5.0 ml (36.5 mmol) of dimethylethoxysilane were dissolved in 100 ml of tetrahydrofuran, and 1 mg of dicyclopentadienyl-platinum dichloride was added thereto. The whole was stirred at 50° C. overnight. Removal of the solvent by distillation afforded an ethoxysilyl compound (40) as a crude product. Then, the product was dissolved in 40 ml of acetone and 60 ml of tetrahydrofuran, and a solution of 5.0 g (36.0 mmol) of potassium carbonate dissolved in 50 ml of water and 120 ml of tetrahydrofuran was added thereto. The whole was stirred at room temperature overnight. The reaction mixture was poured into an excess of ice-water containing 8.0 g of potassium dihydrogen phosphate and the whole was extracted with methylene chloride. After removal of the solvent by distillation, the residue was purified by silica gel column chromatography to obtain 4.00 g of a silanol compound (41) as a white olid (yield: 41.1% through two steps).

$^1$H-NMR, δ (CDCl$_3$, ppm); 0.15 (s, 6H), 0.50–2.22 (m, 17H), 3.66 (dd, 1H, J=8.6, 7.2Hz), 4.04 (t, 1H, J=6.4Hz), 4.09 (t, 2H, J=8.5Hz), 4.50–4.80 (m, 1H), 6.97 (d, 2H, J=9.0Hz), 7.21 (d, 2H, J=9.2Hz), 7.59 (d, 2H, J=9.0Hz), 8.13 (d, 2H, J=8.8Hz).

IR (KBr, cm$^{-1}$); 3000–3600 (—OH), 2950, 2930, 2850, 1740, 1720, 1600, 1515, 1400, 1280, 1260 (Si—C), 1210, 1140, 1080, 870, 840, 760.

Mass (m/e); 499 (M$^+$), 263, 237, 195, 121, 75 (HOMe$_2$Si$^+$). $[\alpha]_D{}^{20}$ =8.4 (C=1.54, CHCl$_3$).

To a solution 3.80 g (7.60 mmol) of the resulting compound (41) dissolved in 80 ml of tetrahydrofuran under an argon gas atmosphere were added 1.70 ml (23.5 mmol) of triethylamine and 1.70 g (7.71 mmol) of 3-methacryloxypropyldimethylchlorosilane and the whole was stirred at room temperature overnight. A white salt formed was filtrated off under washing with diethyl ether. After removal of the solvent by distillation, the residue was purified by silica gel column chromatography to obtain 1.20 g of the desired monomer (42) as a white solid (yield: 31.2%).

1H-NMR, δ (CDCl$_3$, ppm); 0.10 (s, 6H), 0.12 (s, 6H), 0.30–2.00 (m, 21H), 1.95 (s, 3H), 3.65 (dd, 1H, J=7.5, 8.5Hz), 4.02 (t, 2H, J=6.8Hz), 4.11 (t, 2H, J=6.9Hz), 3.91–4.18 (m, 1H), 5.54 (t, 1H, J=1.6Hz), 6.10 (s, 1H), 6.97 (d, 2H, J=8.8Hz), 7.21 (d, 2H, J=9.0Hz), 7.60 (d, 2H, J=9.0Hz), 8.13 (d, 2H, J=8.8Hz).

IR (KBr, cm$^{-1}$); 2950, 2930, 2850, 1740 (C=O), 1720, 1600, 1500, 1400, 1320, 1290, 1250, 1200, 1160, 1000–1100 (SiOSi), 980, 840, 800, 760.

Mass (m/e); 683 (M$^+$), 668 (M$^+$–Me), 421, 217, 121, 69 (CH$_2$=C (CH$_3$) COO$^+$).

$[\alpha]_D{}^{20}$=+27.2 (C=1.12, CHCl$_3$).

Working Examples 1~12

Synthesis of copolymers and physical properties thereof

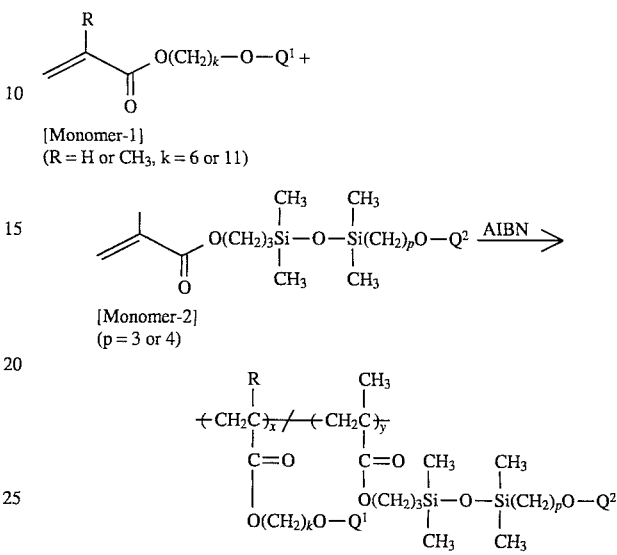

[Copolymer](R=H or CH$_3$, k=6 or 11, p=3 or 4)

Each of the monomers (4)~(8) and (10) having alkylene spacers obtained in Reference Examples 1 and 2 was mixed with each of the monomers having siloxane spacers obtained in Reference Example 3~9 in a ratio cited in Table 1, and the mixture was dissolved in tetrahydrofuran so that the concentration of the total monomers was to be 0.5 mol/l. Further, azobisisobutyronitrile was added so that the concentration was to be 25 mmol/l. After the solution was conducted at 60° C. for 24 hours. The reaction mixture was poured into excess of methanol. The resulting precipitate was recovered and dissolved in tetrahydrofuran, and reprecipitated from methanol. The reprecipitation was repeated. With respect to the obtained copolymers, $^1$H-NMR analyses were conducted to determine the compositions of copolymerization (x/y), and the number average molecular weights and the weight average molecular weights were determined by calculation using polystyrene standard on gel permeation chromatography. In addition, the liquid crystallinity and phase transition temperatures were determined on DSC measurements, X-ray diffraction, and polarization microscopic analyses. Table 1 shows the summary of the results. As is apparent from the table, every copolymer exhibits nematic or smectic liquid crystalline phase at a relatively low temperature such as around room temperature.

TABLE 1

| Sample No. | Monomers -1 | Monomers -2 | Molar ratio monomer-1/ monomer-2 | x/y | Mn$^{a)}$ ×10$^{-4}$ | Mw$^{a)}$ ×10$^{-4}$ | Phase transition temp. (°C.) |
|---|---|---|---|---|---|---|---|
| CP-1 | (4) | (16) | 75/25 | 72/28 | 3.99 | 6.48 | g 37 S 101 I |
| CP-2 | (4) | (16) | 50/50 | 47/53 | 3.57 | 5.45 | g 12 N 66 I |
| CP-3 | (4) | (34) | 75/25 | 75/25 | 6.57 | 9.73 | g 23 S 85 I |
| CP-4 | (4) | (34) | 50/50 | 62/38 | 2.70 | 3.91 | g 13 N 49 I |

TABLE 1-continued

| Sample No. | Monomers -1 | -2 | Molar ratio monomer-1/ monomer-2 | x/y | $Mn^{a)}$ $\times 10^{-4}$ | $Mw^{a)}$ $\times 10^{-4}$ | Phase transition temp. (°C.) |
|---|---|---|---|---|---|---|---|
| CP-5 | (5) | (20) | 75/25 | 78/22 | 1.97 | 2.86 | g 31 S 99 I |
| CP-6 | (5) | (20) | 50/50 | 49/51 | 2.15 | 2.88 | g 19 N 64 I |
| CP-7 | (5) | (38) | 75/25 | 81/19 | 1.98 | 2.88 | g 15 S 69 I |
| CP-8 | (5) | (38) | 50/50 | 55/45 | 1.36 | 2.17 | g 18 N 27 I |
| CP-9 | (6) | (24) | 50/50 | 51/49 | 9.33 | 12.9 | g 60 S 184 I |
| CP-10 | (7) | (28) | 50/50 | 55/45 | 6.42 | 9.43 | g 72 S 182 I |
| CP-11 | (8) | (42) | 80/20 | 79/21 | 6.11 | 10.1 | g 14 S* 40 S 105 N 114 I |
| CP-12 | (10) | (20) | 75/25 | 62/38 | 0.370 | 0.487 | g −6 N 40 I | a)Mn; the number average molecular weight
Mw; the weight average molecular weight
b)g; glass state, S; smectic phase
S*; chiral smectic phase, N; nematic phase,
I; isotropic phase The followings are $^1$H-NMR spectrum data of the obtained copolymers ($\delta$CDCl$_3$, ppm).

CP-1, CP-2:0.07 (s), 0.09 (s), 0.52 (bs), 0.65 (bs), 0.90–1.90 (m), 3.93 (bt), 6.88 (m), 7.05 (d), 8.08 (bs).

CP-3, CP-4: 0.06 (s), 0.48 (bs), 0.55 (bs), 0.80–1.90 (m), 3.96 (b%), 6.50 (bs), 6.90 (m), 7.06 (bs), 7.20 (bs), 7.47 (bs), 7.54 (bs), 8.01 (bs), 8.09 (bs).

CP-5, CP-6: 0.08 (s), 0.52 (bs), 0.65 (bs), 0.80–1.90 (m), 3.92 (bs), 4.00 (m), 6.94 (bs), 7.32 (bs), 7.70 (bs), 8.10 (bs).

CP-7, CP-8:0.07 (s), 0.49 (bs), 0.55 (bs), 0.80–2.00 (m), 3.92 (m), 4.01 (m), 6.52 (m), 6.95 (bs), 7.31 (m), 7.60 (bs), 7.70 (m), 8.03 (m), 8.10 (bs).

CP-9: 0.07 (s), 0.55 (bs), 0.65 (bs), 0.80–1.90 (m), 3.95 (m), 6.91 (m), 7.18 (m), 7.44 (bd), 7.50 (m), 8.10 (m).

CP-10: 0.07 (s), 0.54 (bs), 0.65 (bs), 0.90–1.90 (m), 3.95 (m), 6.91 (m), 7.18 (m), 7.43 (m), 7.50 (m), 8.10 (m).

CP-11: 0.05 (s), 0.55 (bs), 0.64 (bs), 0.80–2.10 (m), 3.97 (m), 4.55 (m), 6.92 (bs), 7.20 (m), 7.50 (m), 8.10 (bs).

CP-12: 0.07 (s), 0.52 (bs), 0.64 (bs), 1.3–2.1 (m), 3.97 (m), 6.95 (m), 7.33 (m), 7.49 (m), 7.63 (m), 8.10 (m).

Reference Example 10

Synthesis of a monomer having a siloxane spacer

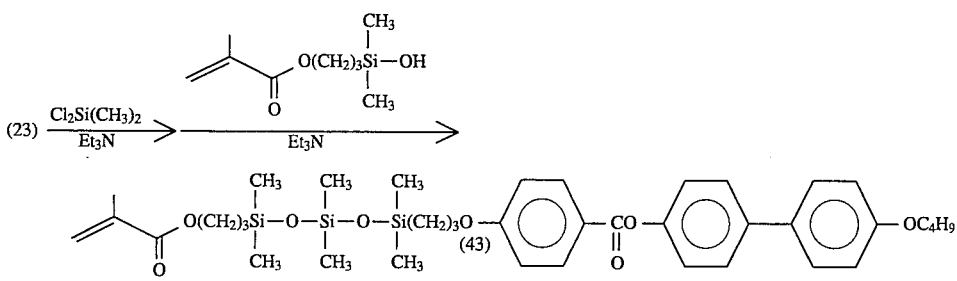

To a solution 1.48 g (8.15 mmol) of the compound (23) obtained in Reference Example 5 dissolved in 100 ml of tetrahydrofuran under an argon gas atmosphere was added 0.43 ml (3.09 mmol) of triethylamine. 30.0 ml (247 mmol) of dichlorodimethylsilane was placed in a 500 ml three-necked flask and was cooled to 0° C. with ice bath. The above solution was slowly added dropwise through dropping funnel under an argon gas atmosphere thereto and the whole was further stirred at 0° C. for 1 hour. Then, the reaction flask was connected to a vacuum pump and excess dichlorodimethylsilane and the solvent were removed under reduced pressure to render the intermediary product to be dryness. After the product was again dissolved into 30 ml of anhydrous tetrahydrofuran, 0.75 g (3.71 mmol) of 3-methacryloxypropyldimethylsilanol was added thereto and the whole was stirred at room temperature overnight. A white salt formed was filtrated off under washing with diethyl ether. The product was purified by silica gel column chromatography to obtain 1.57 g of the desired monomer (43) as a white solid (yield: 68.8%).

$^1$H-NMR, $\delta$ (CDCl$_3$, ppm); 0.20 (s, 18H), 0.54–0.86 (m, 4H), 1.01 (t, 3H, J=6.2Hz), 1.20–2.22 (m, 8H), 2.25 (s, 3H), 4.36 (m, 6H), 6.08 (m, 1H), 6.68 (m, 1H), 7.43 (d, 4H, J=7.9Hz), 7.70 (d, 2H, J=7.9Hz), 7.94 (d, 2H, J=8.6Hz), 8.05(d, 2H, J=8.6Hz), 8.60 (d, 2H, J=8.9Hz).

IR (KBr, cm$^{-1}$); 2970, 2940, 2900, 1730 (C=O), 1640, 1605, 1580, 1515, 1500, 1475, 1420, 1320, 1290, 1260 (Si—C), 1220, 1170, 1110–1000 (SiOSi), 970, 940, 900, 840, 800.

Mass (m/e); 736 (M$^+$), 635, 561, 487, 439, 291, 217, 69 (CH$_2$=C (CH$_3$) CO$^+$), 41 ( CH$_2$=C (CH$_3$) $^+$).

Working Example 13

Synthesis of a copolymer and physical properties thereof

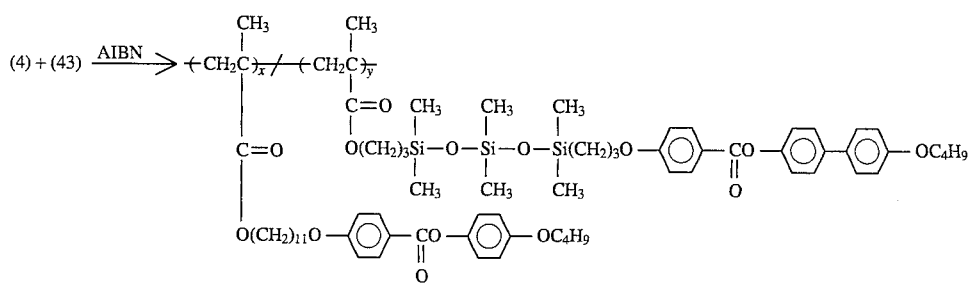

The monomer (4) obtained in Reference Example 1 and the monomer (43) obtained in Reference Example 10 were mixed in a ratio of 50/50, and were copolymerized and purified according to the same method as described in Examples 1~12 to obtain a copolymer (CP-13). With respect to the obtained polymer, the composition of copolymerization (x/y) was determined as 47/53 on 1H-NMR analysis, and the number average molecular weight and the weight average molecular weight were determined as $2.42 \times 10^4$ and $3.47 \times 10^4$, respectively by calculation using polystyrene standard on gel permeation chromatography. In addition, the liquid crystallinity and phase transition temperature were measured on DSC measurements, X-ray diffraction, and polarization microscopic analyses.

phase transition temperature(°C.); g 29 S 93 N 146 I $^1$H-NMR, δ (CDCl$_3$, ppm); 0.08 (s), 0.14 (m), 0.56 (bs), 0.70 (m), 0.80–1.90 (m), 3.94 (bs), 4.00 (m), 6.91 (bs), 6.97 (m), 7.08 (bs), 7.25 (m), 7.50 (m), 8.10 (bs), 8.16 (m).

Comparative Example

Synthesis of homopolymers and physical properties thereof $$(4)\text{--}(8) \text{ or } (10) \xrightarrow{\text{AIBN}} \mathrm{{+}CH_2C{\!+\!}_z}$$
with R, C=O, O(CH$_2$)$_k$O—Q$^1$
[Homopolymer]
(R = H or CH$_3$, k = 6 or 11)

(16), (20), (24), (28), (34), (38), (42) or (43) $\xrightarrow{\text{AIBN}}$ $\mathrm{{+}CH_2C(CH_3){\!+\!}_z}$
C=O, O(CH$_2$)$_3$Si—O—(Si—O)$_n$—Si(CH$_2$)$_p$O—Q$^2$ (all with CH$_3$)
[Homopolymer]
(n = 0 or 1, p = 3 or 4)

Each of the monomers (4)~(8) and (10) having alkylene spacers obtained in Reference Examples 1 and 2 or each of the monomers having siloxane spacers obtained in Reference Examples 3~10 was polymerized and purified according to the same method as described in Examples 1~12 to obtain a corresponding homopolymer. With respect to the obtained polymers derived from monomers having alkylene spacers, Table 2 shows the number average molecular weights and the weight average molecular weights determined by calculation using polystyrene standard on gel permeation chromatography, and the liquid crystallinity and phase transition temperature determined on DSC measurements, X-ray diffraction, and polarization microscopic analyses. Table 3 shows the number average molecular weights and the weight average molecular weights, and the liquid crystallinity and phase transition temperature with respect to the obtained polymers derived from monomers having siloxane spacers. As is apparent from Table 2, these known homopolymers have higher glass transition temperatures and, as a result, higher temperature ranges at which the polymers exhibit liquid crystallinity than the corresponding copolymers obtained in Examples 1~13. Therefore, it is apparent that the copolymerization with a monomer having a siloxane spacer shifts the temperature range of liquid crystalline phase to lower temperature side. In addition, the comparison of the results shown in Table 1 and 3 apparently indicates that the glass transition temperature of a copolymer of the present invention is close to that of a corresponding homopolymer having a siloxane spacer.

TABLE 2

| Sample No. | Monomer | Mn$^{a)}$ ×10$^{-4}$ | Mw$^{a)}$ ×10$^{-4}$ | Phase transition temp. (°C.) |
|---|---|---|---|---|
| HP-1 | (4) | 4.35 | 7.36 | g 52 S 132 I |
| HP-2 | (5) | 3.81 | 6.71 | g 51 S 125 I |
| HP-3 | (6) | 8.55 | 12.5 | g 104 S 229 I |
| HP-4 | (7) | 9.21 | 15.6 | g 100 S 211 I |
| HP-5 | (8) | 6.75 | 11.0 | g 40 S* 58 S 112 I |
| HP-6 | (10) | 0.346 | 0.469 | g 10 N 99 I |

$^{a)}$Mn; the number average molecular weight
Mw; the weight average molecular weight
$^{b)}$g; glass state, S; smectic phase
S*; chiral smectic phase, N; nematic phase,
I; isotropic phase a) Mn; the number average molecular weight Mw; the weight average molecular weight b) g; glass state, S; smectic phase S*; chiral smectic phase, N; nematic phase, I; isotropic phase

TABLE 3

| Sample No. | Monomer | Mn$^{a)}$ ×10$^{-4}$ | Mw$^{a)}$ ×10$^{-4}$ | Phase transition temp. (°C.) |
|---|---|---|---|---|
| HP-7 | (16) | 4.93 | 9.88 | g −3 I |
| HP-8 | (20) | 3.49 | 6.40 | g 7 I |
| HP-9 | (24) | 2.12 | 4.44 | g 33 S 144 I |
| HP-10 | (28) | 2.37 | 4.38 | g 42 S 164 I |
| HP-11 | (34) | 0.428 | 0.541 | g 8 I |
| HP-12 | (38) | 1.61 | 2.18 | g 8 I |
| HP-13 | (42) | 3.05 | 4.44 | g 19 S* 143 I |
| HP-14 | (43) | 0.391 | 0.502 | g −6 S 156 I |

$^{a)}$Mn; the number average molecular weight
Mw; the weight average molecular weight
$^{b)}$g; glass state, S; smectic phase
S*; chiral smectic phase, N; nematic phase,
I; isotropic phase

Industrial Applicability

The copolymer of the present invention contains a repeating unit having a siloxane bond of high mobility in the spacer, whereby the glass transition temperature is low at a level of room temperature or lower, and the copolymer exhibits stable liquid crystallinity in a wide temperature range from a relatively low temperature, i.e., at a room temperature or a lower temperature, as shown in Examples. Accordingly, the polymer having mesogenic groups of the present invention is useful for display materials, recording materials, or non-linear optical materials in the electronics fields and for various other applications such as light-controlling glass material or separating membrane materials in which its characteristics are advantageously utilized.

We claim:

1. A copolymer having a mesogenic group in the side chain comprising a repeating unit represented by the following formula (I):

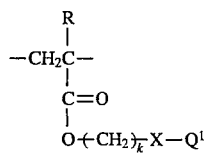

wherein, R is a hydrogen atom, a halogen atom, an alkyl group or a phenyl group, X is a single bond, an oxygen atom or a group of the formula —COO— or —OCO—, $Q^1$ is a mesogenic group, and k is an integer of from 2 to 20, and a repeating unit represented by the following formula (II):

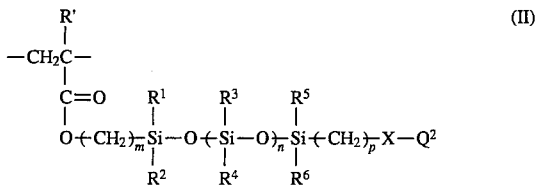

wherein, R', which may be the same or different to the above R, is a hydrogen atom, a halogen atom, an alkyl group or a phenyl group, each of $R^1$ to $R^6$, which may be the same or different, is an alkyl group or a phenyl group, X is a single bond, an oxygen atom or a group of the formula —COO— or —OCO—, $Q^2$, which may be the same or different to the above $Q^1$, is a mesogenic group, each of m and p is an integer of from 2 to 10, and n is an integer of from 0 to 10; and the molar ratio of the repeating unit of the formula (I) to the repeating unit of the formula (II) ranges from 95/5 to 20/80 and the number average molecular weight is at least 1,000.

2. A copolymer as defined in claim 1, wherein the molar ratio of the repeating unit of the formula (I) to the repeating unit of the formula (II) ranges from 90/10 to 40/60.

* * * * *